(12) United States Patent
Kukielka

(10) Patent No.: US 10,933,785 B2
(45) Date of Patent: Mar. 2, 2021

(54) PORTABLE HI-BACK CAR SEAT/RESTRAINT SYSTEM/SEAT PAD ASSEMBLIES AND METHODS OF MAKING AND USING SAME

(71) Applicant: Robert Kukielka, Fleetwood, PA (US)

(72) Inventor: Robert Kukielka, Fleetwood, PA (US)

(*) Notice: Subject to any disclaimer, the term of this patent is extended or adjusted under 35 U.S.C. 154(b) by 0 days.

(21) Appl. No.: 16/546,106

(22) Filed: Aug. 20, 2019

(65) Prior Publication Data
US 2020/0062154 A1  Feb. 27, 2020

Related U.S. Application Data

(60) Provisional application No. 62/720,162, filed on Aug. 21, 2018.

(51) Int. Cl.
| | |
|---|---|
| *B60R 22/00* | (2006.01) |
| *B60R 22/10* | (2006.01) |
| *B60N 2/68* | (2006.01) |
| *B60R 22/02* | (2006.01) |
| *B60R 22/26* | (2006.01) |
| *B60R 22/12* | (2006.01) |

(52) U.S. Cl.
CPC .......... *B60N 2/688* (2013.01); *B60R 22/024* (2013.01); *B60R 22/12* (2013.01); *B60R 22/26* (2013.01); *B60R 2022/266* (2013.01)

(58) Field of Classification Search
CPC ....... B60N 2/688; B60R 22/024; B60R 22/12; B60R 22/26; B60R 2022/266
USPC .............. 297/230.1, 230.11, 230.12, 230.13, 297/230.14, 464, 465, 467, 484, 485, 486, 297/250.1, 253
See application file for complete search history.

(56) References Cited

U.S. PATENT DOCUMENTS

| | | | | |
|---|---|---|---|---|
| 2,060,298 | A | * 11/1936 | Gailey ................... | A47C 7/425 297/230.13 |
| 3,834,758 | A | * 9/1974 | Soule .................... | B60R 22/105 297/484 |
| 3,954,280 | A | * 5/1976 | Roberts ................. | B60R 22/105 297/484 X |
| 3,992,028 | A | * 11/1976 | Abe ....................... | B60N 2/002 297/485 X |

(Continued)

OTHER PUBLICATIONS https://www.youtube.com/watch?v=PfpOOB09nzc.
https://www.imminet.com/products/immi-go-seat/.

*Primary Examiner* — Rodney B White
(74) *Attorney, Agent, or Firm* — James R. McDaniel

(57) ABSTRACT

A hi-back vehicle seat and seat pad restraint system includes a vehicle seat assembly having a vehicle seat back and a vehicle seat operatively connected to the vehicle seat back, a hi-back vehicle seat assembly operatively connected to the vehicle seat assembly, a vehicle safety belt assembly operatively connected to the vehicle seat assembly, wherein the vehicle safety belt assembly interacts with the hi-back vehicle seat assembly, a seat pad assembly located on the vehicle and attached to the vehicle seat assembly. Furthermore, the hi-back vehicle seat assembly can be equipped with a five (5) point harness. Also, the seat pad assembly can be equipped with a seat pad assembly restraining shoulder strap and a restraining shoulder strap connector to keep the shoulder portion of vehicle seat belts correctly positioned over the torso of the end user.

11 Claims, 15 Drawing Sheets

(56) References Cited

U.S. PATENT DOCUMENTS

| | | | |
|---|---|---|---|
| 3,992,040 A * | 11/1976 | Gannac | B60R 22/105 297/465 |
| 4,063,778 A | 12/1977 | Chika | |
| 4,226,474 A * | 10/1980 | Rupert | A47D 15/006 297/465 X |
| 4,243,266 A | 1/1981 | Anderson | |
| 4,639,946 A * | 2/1987 | Koenig | A41B 13/00 297/465 X |
| 4,819,278 A * | 4/1989 | Ramos | A47K 17/02 297/464 X |
| 4,840,404 A | 6/1989 | Falterman | |
| 4,848,793 A * | 7/1989 | Huspen | B60R 22/105 297/465 X |
| 4,927,211 A * | 5/1990 | Bolcerek | A47D 15/006 297/467 X |
| 5,054,854 A * | 10/1991 | Pruit | A47C 7/383 297/284.3 |
| 5,074,588 A * | 12/1991 | Huspen | B60R 22/105 297/465 X |
| 5,169,174 A | 12/1992 | Gray | |
| 5,301,371 A * | 4/1994 | Chao | A41D 13/0007 297/464 X |
| 5,468,020 A * | 11/1995 | Scime | B60N 2/2803 297/219.12 X |
| 5,496,092 A * | 3/1996 | Williams | A61F 5/3792 297/464 X |
| 5,733,014 A * | 3/1998 | Murray | B60R 22/14 297/465 |
| 5,839,792 A | 11/1998 | Baik | |
| 5,915,335 A | 6/1999 | Holt, Jr. | |
| 6,006,967 A * | 12/1999 | Tsao | A45C 7/0086 297/485 X |
| 6,009,839 A * | 1/2000 | Kohn | A47D 13/086 297/465 X |
| 6,053,580 A * | 4/2000 | White, Sr. | A61F 5/3784 297/467 |
| 6,314,578 B1 * | 11/2001 | Masuda | B60N 2/2803 297/465 X |
| 6,364,417 B1 * | 4/2002 | Silverman | A47D 15/006 297/464 |
| 6,402,251 B1 * | 6/2002 | Stoll | B60N 2/265 297/250.1 |
| 6,527,339 B2 * | 3/2003 | Voris | B60N 2/2881 297/230.14 X |
| 6,547,334 B1 * | 4/2003 | Girardin | B60R 22/105 297/467 |
| 6,616,242 B1 * | 9/2003 | Stoll | B60N 2/265 297/250.1 |
| 6,676,219 B1 | 1/2004 | Brewer | |
| 6,688,701 B1 * | 2/2004 | Weaver | B60R 22/024 297/484 X |
| 6,820,902 B2 * | 11/2004 | Kim | A41D 13/018 280/748 |
| 6,863,350 B1 * | 3/2005 | McCulley | B60N 2/2806 297/467 X |
| 6,902,193 B2 * | 6/2005 | Kim | A41D 13/018 297/465 X |
| 6,932,429 B2 * | 8/2005 | Kamiki | B60N 2/2812 297/219.12 |
| 6,955,403 B1 * | 10/2005 | Weaver | B60R 22/024 297/484 X |
| 7,000,985 B2 * | 2/2006 | Belgarde | A47D 1/103 297/485 X |
| 7,188,899 B1 * | 3/2007 | McClellan-Derrickson | B60N 2/2806 297/467 X |
| 7,347,494 B2 * | 3/2008 | Boyle | B60N 2/2806 297/464 X |
| 7,488,038 B2 * | 2/2009 | Boyle | B60N 2/2806 297/250.1 |
| 7,552,969 B2 * | 6/2009 | Maciejczyk | B60N 2/2809 297/484 X |
| 7,699,402 B2 * | 4/2010 | DeLellis | B60R 22/105 297/485 |
| 7,703,806 B2 | 4/2010 | Bell et al. | |
| 7,770,969 B2 * | 8/2010 | Boyle | B60N 2/2806 297/484 X |
| 7,798,527 B2 * | 9/2010 | Walton | B60R 22/00 280/801.1 |
| 7,997,658 B2 * | 8/2011 | DeLellis | B60R 22/105 297/484 |
| 8,007,046 B2 * | 8/2011 | Rothschild | B64D 11/06 297/485 |
| 8,210,617 B2 * | 7/2012 | Aaron | B60N 2/2866 297/484 |
| 8,251,457 B2 * | 8/2012 | Britton | B60N 2/2851 297/467 |
| 8,256,840 B2 * | 9/2012 | Dasent | B60N 2/2809 297/253 |
| 8,794,709 B2 * | 8/2014 | Kennedy | B60N 2/2812 297/467 X |
| 8,833,854 B2 * | 9/2014 | Lu | A47D 1/103 297/253 |
| 8,967,715 B2 * | 3/2015 | Carpenter | B60N 2/2887 297/253 |
| 9,067,561 B2 * | 6/2015 | Crews | B60N 2/265 |
| 9,238,424 B1 * | 1/2016 | Foster | B60N 2/2881 |
| 9,272,641 B2 * | 3/2016 | Hartenstine | B60N 3/101 |
| 9,376,088 B2 | 6/2016 | Sumroy | |
| 9,561,744 B2 * | 2/2017 | Galbreath | B60N 2/66 |
| 9,643,520 B2 * | 5/2017 | Lee | B60N 2/26 |
| 9,845,030 B2 * | 12/2017 | Palma | B60N 2/882 |
| 9,884,604 B2 * | 2/2018 | Hulitt | B60R 22/12 |
| 9,981,629 B2 * | 5/2018 | Farrugia | B60R 22/105 |
| 10,131,317 B1 * | 11/2018 | Harrington | B60R 22/105 |
| 10,259,357 B2 * | 4/2019 | Dingman | B60N 2/286 |
| 10,315,615 B2 * | 6/2019 | Rivera | B60R 22/22 |
| 10,661,749 B2 * | 5/2020 | Kim | B60R 22/20 |
| 10,668,890 B2 * | 6/2020 | Rock | B60R 22/024 |
| 2002/0145279 A1 * | 10/2002 | Murray | B60R 22/105 280/801.1 |
| 2004/0169411 A1 * | 9/2004 | Murray | B60R 22/105 297/486 |
| 2007/0001495 A1 * | 1/2007 | Boyle | B60N 2/2806 297/484 X |
| 2011/0031790 A1 * | 2/2011 | Smith, Sr. | B60N 2/663 297/230.12 |
| 2015/0069813 A1 * | 3/2015 | Furr | B60R 22/00 297/484 |
| 2016/0144823 A1 | 5/2016 | Williams | |
| 2018/0022241 A1 * | 1/2018 | Jewkes | B60N 2/2806 297/253 |
| 2019/0126793 A1 * | 5/2019 | Tan | B60N 2/663 |
| 2019/0270426 A1 * | 9/2019 | Archibald | B60N 2/2809 |

* cited by examiner

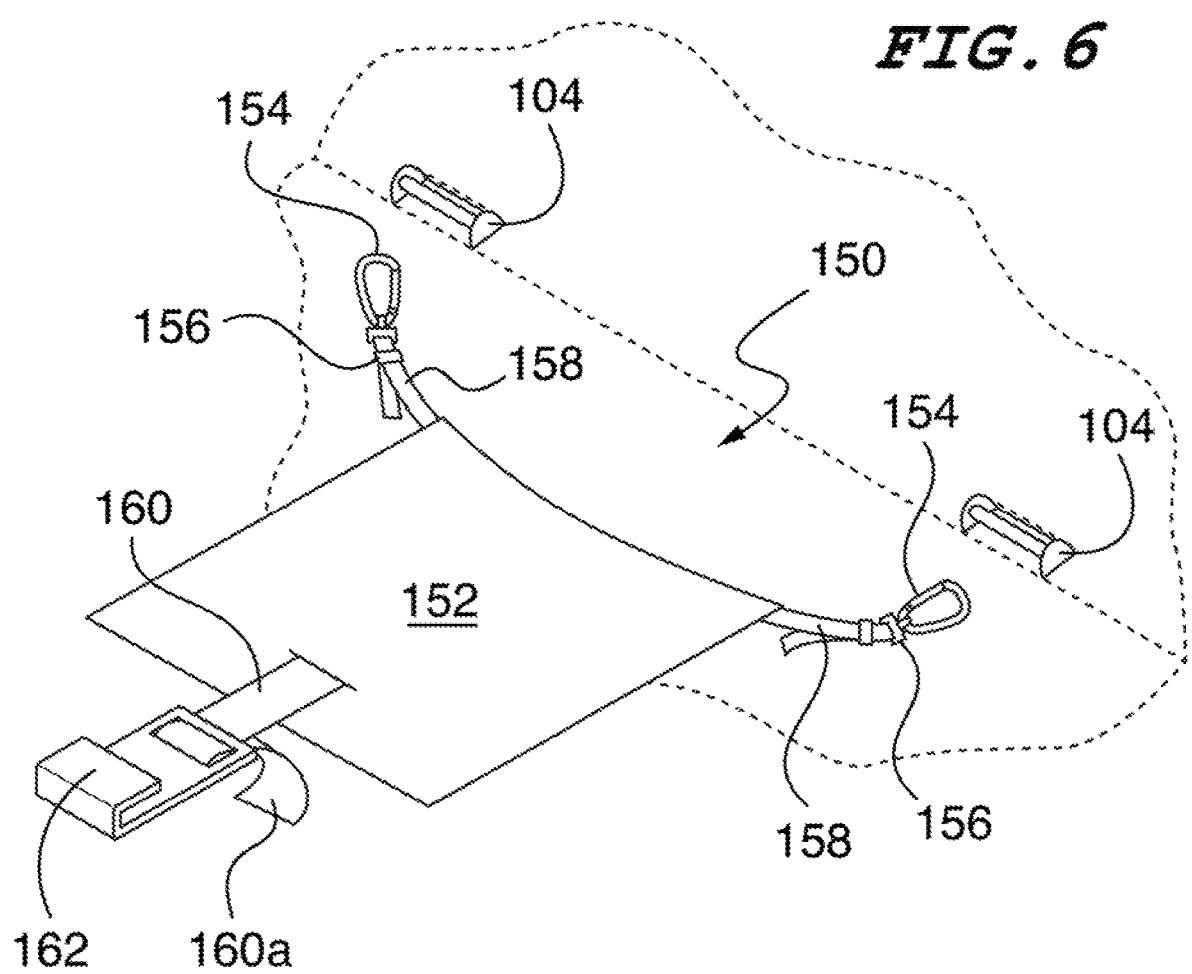

PORTABLE HI-BACK CAR SEAT/RESTRAINT SYSTEM/SEAT PAD ASSEMBLIES AND METHODS OF MAKING AND USING SAME

FIELD OF THE INVENTION

The present invention is generally related to portable hi-back car seat/restraint system/seat pad assemblies. More particularly, in one embodiment, the portable hi-back car seat assembly is constructed of two pieces such that the upper piece is secured to a vehicle upper anchor or headrest and lower anchors in order to allow the hi-back car seat to hang down over an existing car seat wherein the hi-back car seat assembly can be easily detached and rolled up, stored away or easily transported. Also, the novel portable hi-back car seat assembly includes an adjustable lap belt that is connected to the existing vehicle lower anchors located behind a conventional motorized vehicle car seat such that an adjustable extension strap is operatively connected to the adjustable lap belt. The adjustable extension strap then is connected to the existing seat belt assembly of the motorized vehicle to securely retain the end user and prohibit from possible slouching or dangers of moving lap belt up the user body. In another embodiment of the portable hi-back car seat assembly, the portable hi-back car seat assembly is constructed of three pieces such that the upper piece is located adjacent to a vehicle upper anchor or headrest and lower anchors and the portable hi-back car seat assembly is located over an existing car seat. Optionally, the upper piece can be securely retained on the vehicle upper anchor or headrest by an upper piece attachment assembly. Also, the novel portable hi-back car seat assembly includes an adjustable strap that is connected to the existing vehicle lower anchors and the upper anchor or headrest. Finally, the upper piece, the lower piece and swiveling seat belt retainers of the portable hi-back car seat assembly are removably retained on the straps that are attached to the vehicle upper anchor or headrest and the vehicle lower anchors. The portable hi-back car seat assembly can also be used in conjunction with an adjustable extension strap that is operatively connected to an adjustable lap belt. The adjustable extension strap then is connected to the existing seat belt assembly of the motorized vehicle to securely retain the end user. Furthermore, a seat pad assembly can optionally be used where the ability to attach the hi-back car seat assembly is restricted. The seat pad assembly includes an adjustable extension strap that is connected to the existing seat belt assembly of the motorized vehicle to securely retain the end user while the end user sits on the seat pad. Also, the seat pad assembly can include a seat pad shoulder strap that is removably attached to the existing car seat belt strap and can be adjusted to correct positioning of shoulder portion of car seat belt on end user. Still further, a five (5) point safety harness assembly can be attached to the hi-back car seat assembly so as to provide a further restraint for the user. Finally, a safety vest restraint assembly can be used in conjunction with a conventional seat belt assembly to properly retain the end user onto the vehicle car seat. The safety vest restraint assembly uses a unique swiveling seat belt restraint clip that allows the end user to move while being restrained by the seat belt assembly and allows seat belts to follow end user movements without the seat belt assembly contacting the neck or head area of the end user.

BACKGROUND OF THE INVENTION

Prior to the present invention, as set forth in general terms above and more specifically below, it is known to employ various types of supplemental devices for use with existing vehicle seats and safety belts. See, for example, U.S. Pat. No. 4,063,778 by Chika, U.S. Pat. No. 4,243,266 by Anderson, U.S. Pat. No. 4,840,404 by Falterman, U.S. Pat. No. 5,169,174 by Gray, U.S. Pat. No. 5,839,792 by Baik, U.S. Pat. No. 5,915,335 by Holt, Jr., U.S. Pat. No. 6,676,219 by Brewer, U.S. Pat. No. 7,703,806 by Bell et al., U.S. Pat. No. 9,376,088 by Sumroy, U.S. Patent Application 2016/0144823 by Williams, PCT Application WO/93/21044 by Chollet, and EPO Patent 2,719,576 by Tribus B. V.

While these various supplemental devices for use with existing vehicle safety belts may have been generally satisfactory, there is nevertheless a need for a new and improved portable hi-back car seat assembly, in one embodiment, that is constructed of two pieces such that the upper piece is secured to a vehicle headrest in order to allow the hi-back car seat to hang down over an existing car seat wherein the hi-back car seat assembly can be easily rolled up, stored away or transported. Secondly, the novel portable hi-back car seat assembly should include an adjustable lap belt that is connected to the existing vehicle anchors located behind a conventional motorized vehicle car seat such that an adjustable extension strap is operatively connected to the adjustable lap belt. Thirdly, the adjustable extension strap should then be connected to the existing seat belt assembly of the motorized vehicle to securely retain the end user and prevent end user from possibility of slouching and/or moving lap belt to high up on the user's body. Fourthly, the portable hi-back car seat assembly should be as "thin" as possible (not unnecessarily protruding forward from the back seat) so that the end user is further away from the back of the front seat or any other possible obstacle and provides protection against head injuries (the end user has to travel further in order to hit the back of the front seat). Fifthly, the portable hi-back car seat assembly allows the end user to be seated low on the seat which is further away from the back of the front seat. Sixthly, the portable hi-back car seat assembly keeps the end user low on the car seat which changes the end user's center of gravity center and therefore, reduces forward head movements by the end user. Seventhly, in another embodiment of the portable hi-back car seat assembly, the portable hi-back car seat assembly is constructed of three pieces such that the upper piece is located adjacent to a vehicle headrest and the portable hi-back car seat assembly is located over an existing car seat. Also, the upper piece can be securely retained on the vehicle headrest or upper anchor by an upper piece attachment assembly. Further, the novel portable hi-back car seat assembly includes an adjustable strap that is connected to the existing vehicle lower anchors and upper anchors or the headrest. Furthermore, the upper piece, the lower piece and swiveling seat belt retainers of the portable hi-back car seat assembly are removably retained on the straps that are attached to the the vehicle anchors. Eighthly, the portable hi-back car seat assembly can also be used in conjunction with an adjustable extension strap that is operatively connected to an adjustable lap belt. The adjustable extension strap then is connected to the existing seat belt assembly of the motorized vehicle to securely retain the end user and prevent from slouching or moving lap belt to high on the user body. Ninthly, a seat pad assembly can optionally be used where the ability to attach the hi-back car seat assembly is restricted. Tenthly, the seat pad assembly should include an adjustable extension strap that is connected to the existing seat belt assembly of the motorized vehicle to securely retain the end user while the end user sits on the seat pad thereby possibly correcting the lap belt positioning (for example, the seat pad assembly can be utilized by a pregnant woman to keep the lap belt portion away from and under her stomach in order to avoid any pressure in that area) and not allowing the end user to slouch and thereby change positioning of the seat belt assembly to a less safe orientation. Eleventhly, the seat pad assembly can include a seat pad shoulder strap that is removably attached to the existing car seat belt strap and can be adjusted to correct positioning of shoulder portion of car seat belt on end user. Twelfthly, a five (5) point safety harness assembly can be attached to the hi-back car seat assembly so as to provide a further restraint for the user. Thirteenthly, a safety vest restraint assembly can be used in conjunction with a conventional seat belt assembly to properly retain the end user onto the vehicle car seat. Finally, the safety vest restraint assembly uses a unique swiveling seat belt restraint clip that allows the end user to move and allows the shoulder seat belt portion to follow the end user without changing the proper position of the shoulder seat portion on the shoulder while being restrained by the seat belt assembly and an adjustable safety vest assembly without the seat belt assembly contacting the neck or head area of the end user. This following of the shoulder seat belt position with the end user is extremely important during an accident such as when the vehicle is braking and swiveling prior to the final crash and the end user's torso is changing its position.

It is a purpose of this invention to fulfill these and other needs in the supplemental devices for use with existing vehicle safety belts art in a manner more apparent to the skilled artisan once given the following disclosure.

The preferred portable hi-back car seat/restraint system/ seat pad assemblies for use with existing vehicle seats and safety belts or without them in the case of using 5 point system, according to various embodiments of the present invention, offers the following advantages: ease of use; lightness in weight; durability; thinness; the ability of the high back seat portable hi-back car seat assembly to allow an end user to be seated low on the seat; the ability of the safety vest to follow the end user without changing the proper position of the shoulder seat portion on the shoulder; compactness; the ability to be rolled up; improved safety belt characteristics; portability; ease of attachment to existing vehicle anchors; the ability to attach a variety of seat belts; increased safety; physically making harder for end user to slouch and possibility of danger repositioning of lap belt high up on user's body (stomach). In fact, in many of the preferred embodiments, these advantages are optimized to an extent that is considerably higher than heretofore achieved in prior, known supplemental devices for use with existing vehicle safety belt restraint systems.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 3 is a schematic illustration of the hi-back car seat restraint assembly and the car seat pad assembly being installed on a car seat, constructed according to the present invention;

FIG. 6 is a schematic view of an attachable seat pad assembly operatively connected to the existing vehicle anchors, constructed according to the present invention;

FIG. 8A is a schematic isometric view of the end user being retained onto the vehicle seat by the seat pad assembly, constructed according to the present invention

DETAILED DESCRIPTION OF THE PREFERRED EMBODIMENTS OF THE INVENTION

Hi-Back Car Seat Restraint Assembly

Figure 1:
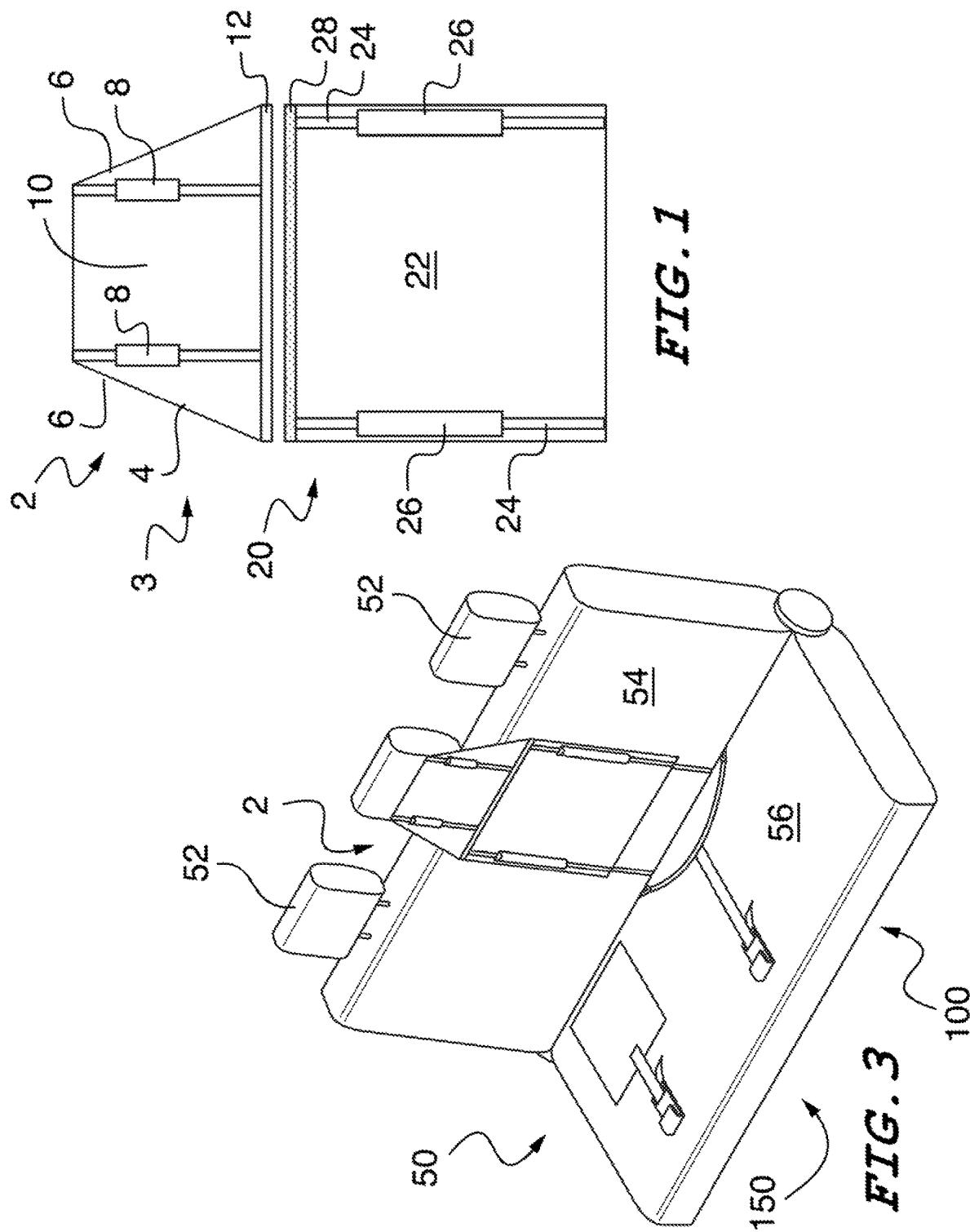
FIG. 1 is schematic illustration of the portable hi-back car seat restraint assembly for use with an adjustable strap assembly having a strap extension, constructed according to one embodiment of the present invention.
Figure 2:
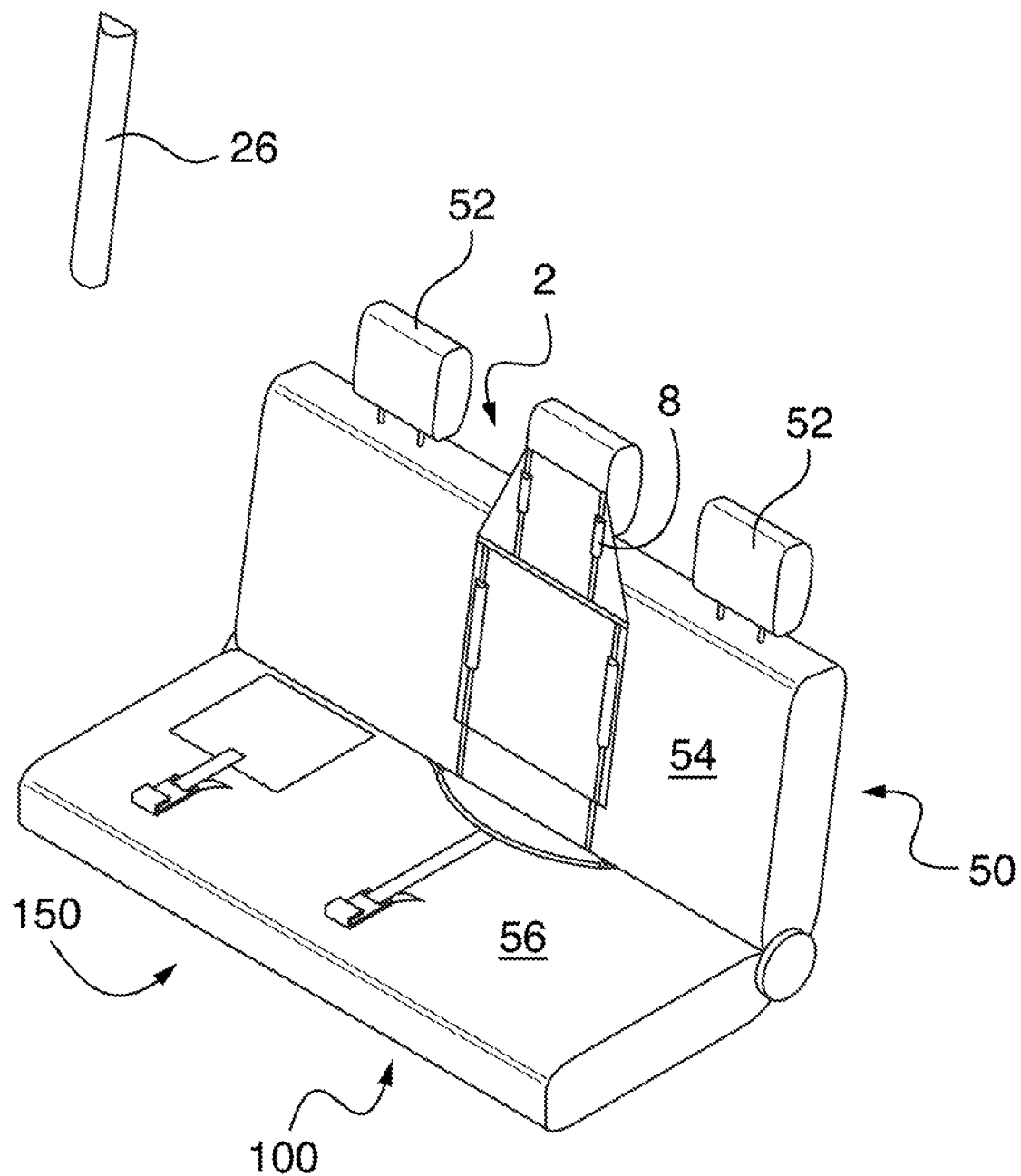
FIG. 2 is a schematic illustration of the hi-back car seat restraint assembly showing the attachment of the head rest and side supports and the car seat pad assembly, constructed according to the present invention.

Referring now to FIGS. 1-3, there is illustrated a portable hi-back car seat assembly 2 for use with an existing vehicle seat assembly 50. As will be explained hereinafter in greater detail, the portable hi-back car seat assembly 2 is constructed of two pieces such that the upper piece is secured to a vehicle upper anchor or headrest in order to allow the portable hi-back car seat assembly 2 to hang down over an existing car seat back wherein the portable hi-back car seat assembly can be easily rolled up. Furthermore, it is to be understood that the portable hi-back car seat assembly 2 should be as "thin" as possible (not unnecessarily protruding forward from the back seat) so that the end user is further away from the back of the front seat or any other possible obstacle and provides protection against head injuries (the end user has to travel further in order to hit the back of the front seat). Also, the portable hi-back car seat assembly 2 should allow the end user to be seated low on the seat which is further away from the back of the front seat. Finally, the portable hi-back car seat assembly 2 should keep the end user low on the car seat which changes the end user's center of gravity center and therefore, reduces forward head movements by the end user.

As shown in FIGS. 1-3, portable hi-back car seat assembly 2 for use with an existing vehicle car seat assembly 50 includes, in part, upper panel assembly 3, upper panel 4, headrest attachment strips 6, headrests 8, conventional headrest attachment device 10, conventional upper panel fastening device 12, lower panel assembly 20, lower panel 22, side rest pad attachment strips 24, side rests 26, conventional lower panel fastening device 28, vehicle seat assembly 50, conventional vehicle seat headrests 52, conventional vehicle seat back 54, conventional vehicle seat 56, adjustable lap belt assembly 100 and seat pad assembly 150. Preferably, upper panel 4, headrests 8, lower panel 22, and side rests 26 are constructed of any suitable, durable, stain resistant, flexible, lightweight material. Also, preferably, headrest attachment strips 6 and side rest attachment strips 24 are firmly secured to upper panel 4 and lower panel 22, respectively and are constructed of Velcro® such that headrests 8 and side rests 26 will be able to be removably secured to headrest attachment strips 6 and side rest attachment strips 24, respectively. Furthermore, conventional upper panel fastening device 12 and lower panel fastening device 28, preferably, are constructed to allow upper panel assembly 3 to be connected to lower panel assembly 20, as will be described in greater detail later. For example, conventional upper panel fastening device 12 and lower panel fastening device 28 can be, but are not limited to, a zipper, hooks, fasteners or the like. Finally, it is to be understood that conventional headrest attachment device 10 is any suitable, durable device that allows portable hi-back car seat assembly 2 to be property retained on headrest 52. In particular, conventional headrest attachment device 10 can be any suitable device that goes around, hangs over and/or attaches to conventional vehicle seat headrests 52 to allow portable hi-back car seat assembly 2 to drape over conventional vehicle seat back 54.

A unique aspect of the present invention is the use of upper panel assembly 3 and lower panel assembly 20. The construction of upper panel assembly 3 and lower panel assembly 20 allows the portable hi-back car seat assembly 2 to be easily rolled up or folded so that portable hi-back car seat assembly 2 can be easily stored and transported in a backpack or other similar type of bag or container.

Another unique aspect of the present invention is the use of headrest attachment strips 6, headrests 8, side rest pad attachment strips 24, and side rests 26. It is to be understood that headrests 8 allow the end user 208 (FIG. 7) to rest his/her head on the headrests 8 while the end user 208 is traveling in the motorized vehicle. As discussed above, the use of the headrest attachment strips 6 allows the headrests 8 to be positioned up or down along the length of the headrest attachment strips 6 so that the headrests 8 are properly positioned with respect to the head of the end user 208. As discussed above, it is to be understood that the headrests 8 are equipped with an attachment device (not shown) that interacts with the headrest attachment strips 6 in order to properly retain the headrests 8 on the headrest attachment strips 6. For example, the backside of headrests 8 may be equipped with Velcro® strips that interact with the Velcro® strip on headrest attachment strips 6.

Furthermore, it is to be understood that side rests 26 allow the end user 208 to rest his/her torso on the side rests 26 while the end user is traveling in the motorized vehicle. As discussed above, the use of the side rest pad attachment strips 24 allows the side rests 26 to be positioned up or down along the length of the side rest pad attachment strips 24 so that the side rests 26 are properly positioned with respect to the torso of the end user 208. As discussed above, it is to be understood that the side rests 26 are equipped with an attachment device (not shown) that interacts with the side rest pad attachment strips 24 in order to properly retain the side rests 26 on the side rest pad attachment strips 24. For example, the backside of side rests 26 may be equipped with Velcro® strips that interact with the Velcro® strip on side rest pad attachment strips 24.

Figure 4:
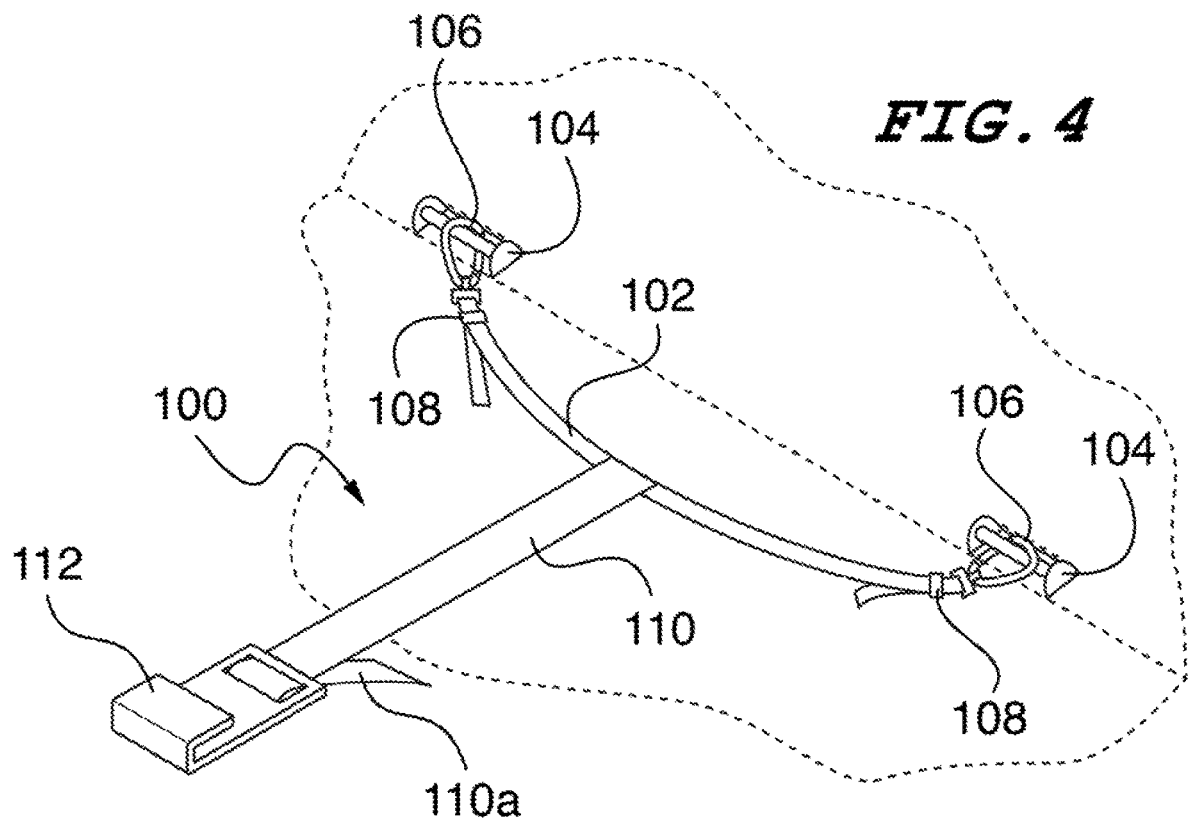
FIG. 4 is a schematic illustration of an adjustable lap belt assembly having a strap extension, constructed according to the present invention.
Figure 5:
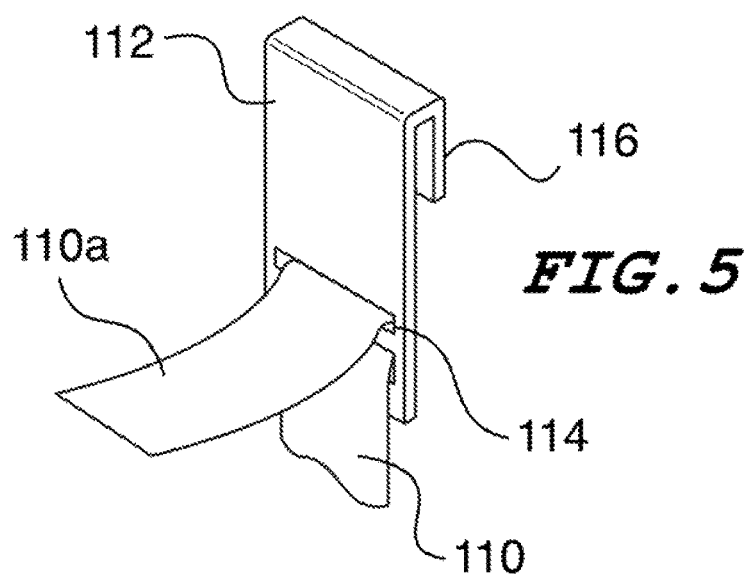
FIG. 5 is an isometric schematic view of a clamp on the strap extension, constructed according to the present invention.
Figure 6A:
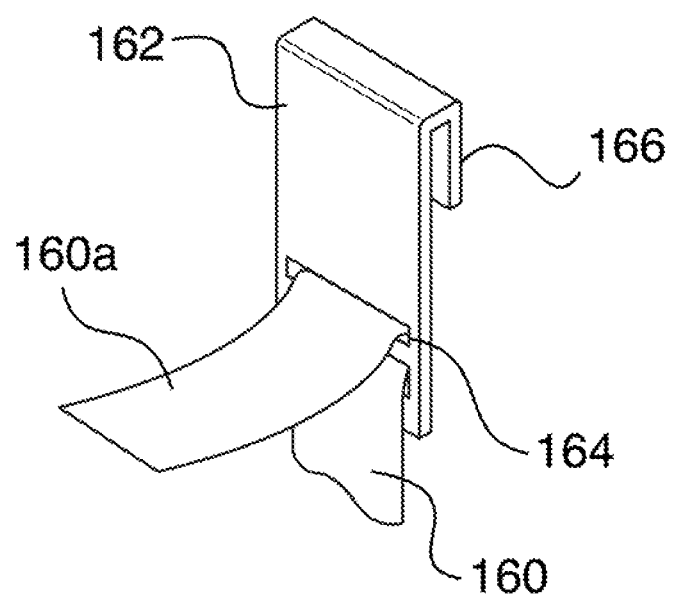
FIG. 6A is a schematic isometric view of a clamp on the seat pad strap extension, constructed according to the present invention

Regarding strap extension adjustment assembly 100, as shown in FIGS. 4 and 5, adjustable lap belt assembly 100 includes, in part, strap 102, conventional vehicle anchors 104, conventional strap fasteners 106, conventional strap adjustment devices 108, extension strap 110, extension strap end 110a, clamp 112, conventional extension strap adjustment device 114, and clamp end 116. Preferably, strap 102, conventional vehicle strap anchors 104, conventional strap fasteners 106, conventional strap adjustment devices 108, extension strap 110, extension strap end 110a, clamp 112, and conventional extension strap adjustment device 114 are constructed of durable, stain resistant, high strength, lightweight material. It is to be understood that extension strap 110 is conventionally attached to strap 102 by well-known fastening techniques such as sewing, adhesives, fasteners or the like. Furthermore, the strap 102 and extension strap 110 should be constructed of a stretchable material to provide give in case the end user experiences a sudden forward movement such as in the case of a head-on vehicle impact.

During the operation of portable hi-back car seat assembly 2, as shown in FIGS. 1-5, 7 and 8, the upper panel assembly 3 and lower panel assembly 20 are fastened together through the use of conventional upper panel fastening device 12 and conventional lower panel fastening device 28, as discussed above. The portable hi-back car seat assembly 2 is then conventionally attached to vehicle headrest 52, as discussed above. It is to be understood that only upper panel assembly 3 (without the attachment of lower panel assembly 20) could be attached to headrest 52 and the present invention would operate in substantially the same manner except that side rests 26 will not be available to provide a support and protection for the torso of the end user 208.

Figure 7:
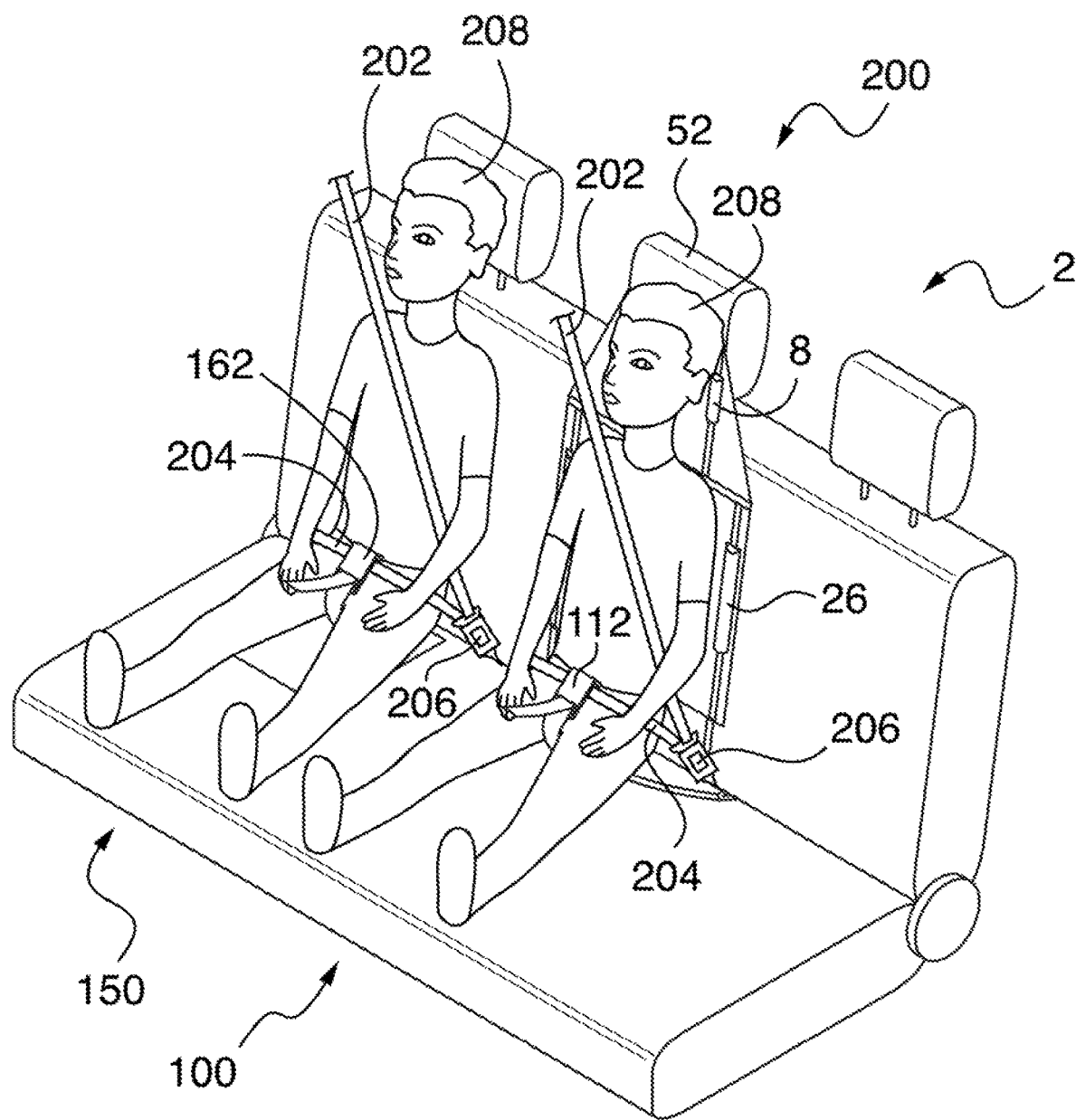
FIG. 7 is a schematic isometric view of the end users being retained onto the vehicle car seat by the hi-back car seat restraint assembly and the attachable seat pad assembly, constructed according to the present invention.

Once the upper panel assembly 3 and lower panel assembly 20 have been attached to vehicle headrest 52, the headrests 8 and side rests 26 can be adjusted to accommodate the desired end user 208 (FIG. 7). In particular, the headrests 8 should be located on headrest attachment strips 6 so that headrests 8 provide the proper support and protection for the end user's head. Also, side rests 26 should be located on side rest pad attachment strips 24 so that side rests 26 provide the proper support and protection for the end user's torso, as shown in FIG. 7.

After the headrest 8 and side rests 26 have been positioned, the adjustable lap belt assembly 100 is then attached to vehicle anchors 104. In particular, strap fasteners 106 are conventionally attached to vehicle strap anchors 104. It is to be understood that strap fasteners 106 can be, but are not limited to clamps, hooks or other similar fastening devices. After strap fasteners 106 are attached to vehicle anchors 104, the ends of strap 102 are conventionally pulled through strap adjustment devices 108 in order to properly secure strap 102 to vehicle anchors 104.

Figure 8:
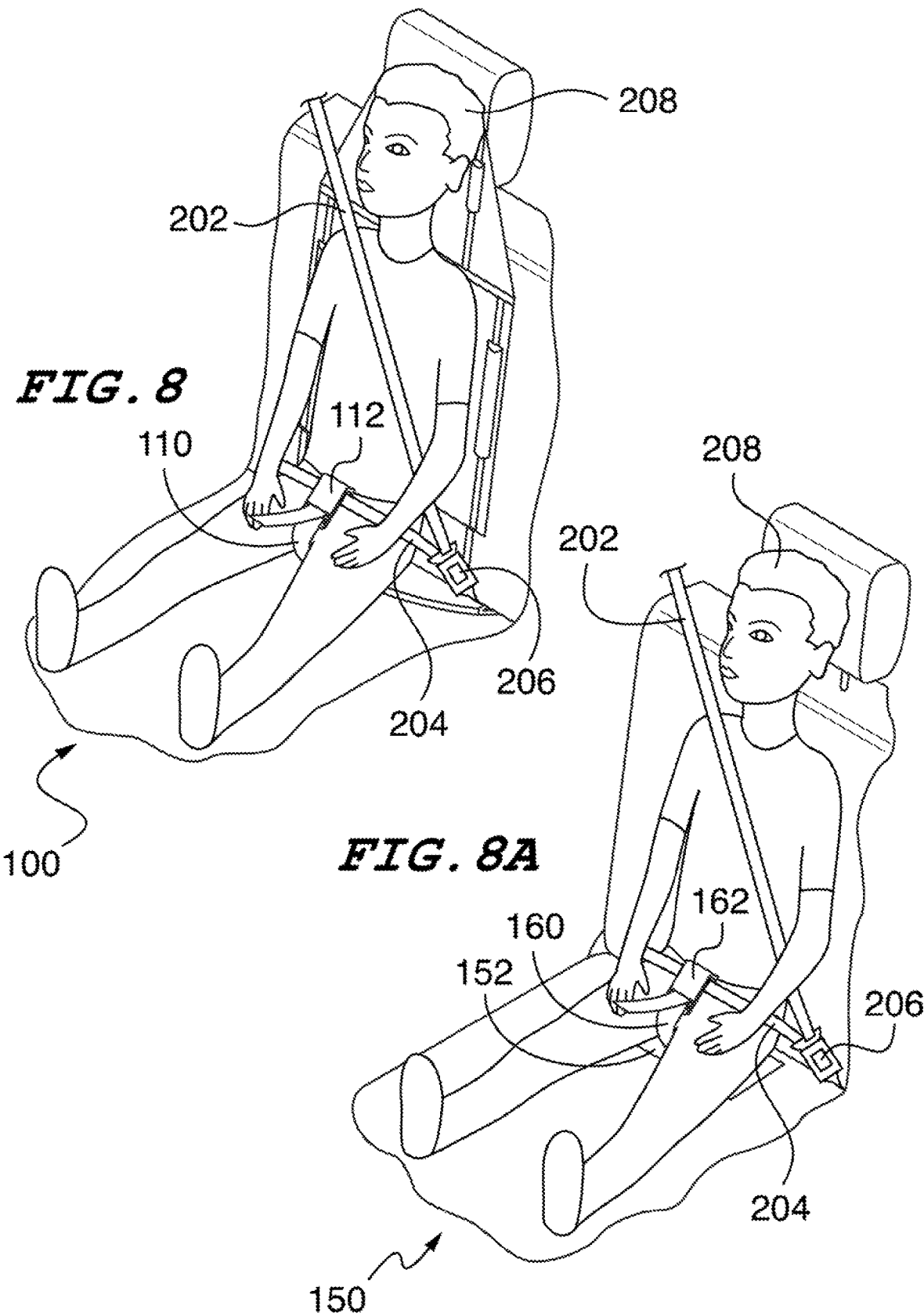
FIG. 8 is a schematic isometric view of the end user being retained onto the vehicle seat by the strap extension adjustment assembly, constructed according to the present invention.

Once the strap 102 has been secured to vehicle anchors 104, the end user 208 (FIG. 7) then locates himself/herself onto portable hi-back car seat assembly 2, as shown in FIGS. 7 and 8. The end user then pulls the conventional vehicle safety belt assembly 200 so that upper seat belt portion 202 of vehicle safety belt assembly 200 is located over the shoulder and torso of the end user 208. Also, the lap belt portion 204 of vehicle safety belt assembly 200 is located over the lap of the end user 208.

After the conventional vehicle safety belt assembly 200 has been located over the end user, the clamp end 116 of clamp 112 is conventionally slipped over the lap belt portion 204 of vehicle safety belt assembly 200 so that the extension strap 110 is now operatively connected to the lap belt portion 204 of the vehicle safety belt assembly 200, as shown in FIGS. 7 and 8. The end user 208 then attaches the vehicle safety belt assembly 200 to the conventional seat belt latch 206. Finally, the end user 208 conventionally pulls on extension strap end 110a so that extension strap 110 is now securely retained on lap belt portion 204 of vehicle safety belt assembly 200 through the use of extension strap adjustment device 114 and clamp 112.

A unique inventive aspect of the present invention is the use of portable hi-back car seat assembly 2 and adjustable lap belt assembly 100 in conjunction with vehicle safety belt assembly 200. In particular, once the end user 208 has been properly restrained onto the vehicle car seat assembly 50 through the use of portable hi-back car seat assembly 2 and vehicle safety belt assembly 200, the headrests 8 will provide impact protection for the end user's head. Also, the side rests 26 will provide impact protection for the end user's torso. Furthermore, due to the fact that the extension strap 110 is now connected to the lap belt portion 204 of vehicle safety belt assembly 200, the extension strap 110 should somewhat keep the end user 208 from slouching forward on the vehicle car seat assembly 50.

Another unique aspect of the present invention is that the headrests 8 and the side rests 26 are adjustable, as discussed earlier. In this manner, the hi-back car seat assembly 2 can be used for end users of various ages and sizes.

A still another unique aspect of the present invention is that due to the fact that the hi-back car seat assembly 2 is constructed of flexible materials. In this manner, the hi-back car seat assembly 2 can be easily rolled-up, folded-up or otherwise compacted so that the hi-back car seat assembly 2 can be easily stored and transported.

Seat Pad Assembly

Referring now to FIGS. 2, 3, 6, 6A, 7 and 8A, there is illustrated a seat pad assembly 150 for use with an existing vehicle seat assembly 50. As will be explained hereinafter in greater detail, the seat pad assembly 150 can optionally be used where the ability to attach the hi-back car seat assembly 2 is restricted. The seat pad assembly 150 can be connected to the existing seat belt assembly 200 of the motorized vehicle to securely retain the end user 208 while the end user 208 sits on the seat pad assembly 150.

As shown in FIGS. 2, 3, 6, 6A, 7 and 8A, seat pad assembly 150 for use with an existing vehicle car seat assembly 50 includes, in part, seat pad 152, adjustable strap 158, conventional vehicle anchors 104, conventional strap fasteners 154, conventional strap adjustment devices 156, extension strap 160, extension strap end 160a, clamp 162, conventional extension strap adjustment device 164, and clamp end 166. Preferably, strap 158, conventional vehicle anchors 104, conventional strap fasteners 154, conventional strap adjustment devices 156, strap ends 158, extension strap 160, extension strap end 160a, clamp 162, conventional extension strap adjustment device 164, and clamp end 166 are constructed of durable, stain resistant, high strength, lightweight materials. It is to be understood that extension strap 160 is conventionally attached to pad 152 by well-known fastening techniques such as sewing, adhesives, fasteners or the like. Furthermore, the adjustable strap 158 and extension strap 160 should be constructed of a stretchable material to provide give in case the end user experiences a sudden forward movement such as in the case of a head-on vehicle impact.

Another unique aspect of the present invention is seat pad 152. It is to be understood that seat pad 152 should be constructed of any suitable, durable, flexible, stain resistant, high strength, non-slip material. However, seat pad 152 should be constructed so that it is thick enough so that it is durable and provides the proper safety characteristics. Also, seat pad 152 should be constructed so that seat pad assembly 150 (or 500 in FIG. 16) can be left on car seat 56. In particular, seat pad 152 should be of a thickness that if seat pad assembly 150 (or 500) is left on car seat 56 and someone sits down on seat pad 152, this individual will not experience any discomfort due to sitting upon seat pad 152.

It is to be understood that the seat pad assembly 150 may include an adjustable extension strap 160 that is connected to the existing seat belt assembly 200 of the motorized vehicle to securely retain the end user 208 while the end user 208 sits on the seat pad assembly 150 thereby possibly correcting the positioning of lap belt portion 204. For example, the seat pad assembly 150 can be utilized by a pregnant woman to keep the lap belt portion 204 away from and under her stomach in order to avoid any pressure in that area. Also, the adjustable extension strap 160 should not allow the end user 208 to slouch and thereby change positioning of the seat belt assembly 200 to a less safe orientation.

A unique aspect of the present invention is the use of seat pad assembly 150. The construction of seat pad assembly 150 allows the seat pad assembly 150 to be easily rolled up or folded so that seat pad assembly 150 can be easily stored and transported in a backpack or other similar type of bag or container.

During the operation of seat pad assembly 150, as shown in FIGS. 2, 3, 6, 6A, 7 and 8A, the seat pad 152 is located on seat 56. The adjustable strap 158 is then conventionally attached to vehicle anchors 104. In particular, strap fasteners 154 are conventionally attached to vehicle strap anchors 104. It is to be understood that strap fasteners 154 can be, but are not limited to clamps, hooks or other similar fastening devices. After strap fasteners 154 are attached to vehicle anchors 104, the ends 158 of adjustable strap 158 are conventionally pulled through strap adjustment devices 156 in order to properly secure adjustable strap 158 to vehicle anchors 104.

Once the adjustable strap 158 has been secured to vehicle anchors 104, the end user 208 then locates himself/herself onto seat pad assembly 150, as shown in FIGS. 7 and 8A. The end user 208 then pulls the conventional vehicle safety belt assembly 200 so that upper seat belt portion 202 of vehicle safety belt assembly 200 is located over the shoulder and torso of the end user 208. Also, the lap belt portion 204 of vehicle safety belt assembly 200 is located over the lap of the end user 208.

After the conventional vehicle safety belt assembly 200 has been located over the end user 208, the clamp end 166 of clamp 162 is conventionally slipped over the lap belt portion 204 of vehicle safety belt assembly 200 so that the extension strap 160 is now operatively connected to the lap belt portion 204 of the vehicle safety belt assembly 200, as shown in FIGS. 7 and 8A. The end user 208 then conventionally attaches the vehicle safety belt assembly 200 to the conventional seat belt latch 206. Finally, the end user 208 conventionally pulls on extension strap end 160a so that extension strap 160 is now securely retained on lap belt portion 204 through the use of extension strap adjustment device 164 and clamp 162.

A unique inventive aspect of the present invention is that seat pad assembly 150 may not have to be used in conjunction with adjustable strap 158, conventional vehicle anchors 104, conventional strap fasteners 154, and conventional strap adjustment devices 156. In particular, if for example, the end user 208 is going for a ride in a taxi cab or other similar mass transit type of vehicle, it may not be convenient for the seat pad assembly 150 to be attached to the vehicle anchors 104. In this instance, the seat pad assembly 150 is located onto the seat 56 and the end user 208 merely places himself/herself onto seat pad assembly 150. The end user 208 then pulls the conventional vehicle safety belt assembly 200 so that upper seat belt portion 202 of vehicle safety belt assembly 200 is located over the shoulder and torso of the end user 208. Also, the lap belt portion 204 of vehicle safety belt assembly 200 is then located over the lap of the end user 208.

In this instance, after the conventional vehicle safety belt assembly 200 has been located over the end user 208, the clamp end 166 of clamp 162 is conventionally slipped over the lap belt portion 204 so that the extension strap 160 is now operatively connected to the lap belt portion 204 of the vehicle safety belt assembly 200, as discussed earlier. The end user 208 then conventionally attaches the vehicle safety belt assembly 200 to the conventional seat belt latch 206. Finally, the end user 208 conventionally pulls on extension strap end 160a so that extension strap 160 is now securely retained on lap belt portion 204 through the use of extension strap adjustment device 164 and clamp 162.

Another unique aspect of the present invention is that due to the fact that the extension strap 160 is now connected to the lap belt portion 204, the extension strap 160 should somewhat keep the end user from slouching forward on the vehicle car seat assembly 50.

A further unique aspect of the present invention is that since the extension strap 160 is adjustable, the seat pad assembly 150 can be used for end users of various ages and sizes.

A still another unique aspect of the present invention is that due to the fact that the seat pad assembly 150 is constructed of flexible materials, the seat pad assembly 150 can be easily rolled-up, folded-up or otherwise compacted so that the seat pad assembly 150 can be easily stored and transported.

Figure 16:
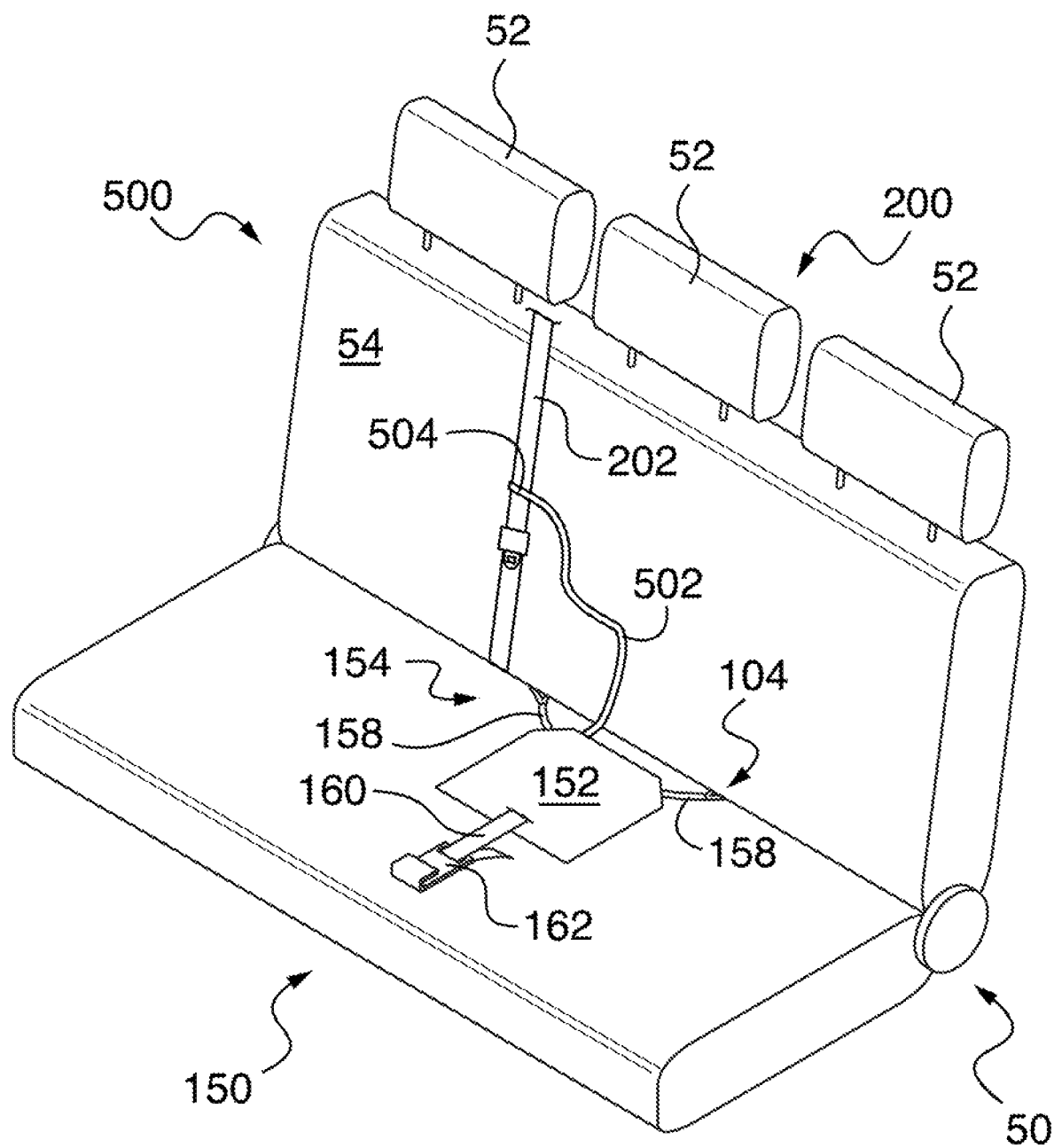
FIG. 16 is a schematic view of second embodiment of an attachable seat pad assembly operatively connected to the existing vehicle anchors and employing a seat belt restraint strap, constructed according to the present invention.

Referring now to FIG. 16, there is illustrated another seat pad assembly 500 for use with an existing vehicle seat assembly 50. As will be explained hereinafter in greater detail, the seat pad assembly 500 can optionally be used where the ability to attach the hi-back car seat assembly 2 is restricted. The seat pad assembly 500 can be connected to the existing seat belt assembly 200 of the motorized vehicle to securely retain the end user while the end user sits on the seat pad assembly 150.

As shown in FIG. 16, seat pad assembly 500 for use with an existing vehicle car seat assembly 50 is to be constructed in the same manner as seat pad assembly 150, as shown in FIGS. 2, 3, 6, 6A, 7 and 8A. It is to be understood that extension strap 160 is conventionally attached to pad 152 by well-known fastening techniques such as sewing, adhesives, fasteners or the like. Furthermore, the adjustable straps 158 and extension strap 160 should be constructed of a stretchable (elastic) material to provide give in case the end user experiences a sudden forward movement such as in the case of a head-on vehicle impact. In this manner, the end user should experience substantially reduced discomfort if the end user experiences a sudden forward movement because the extension strap 160 should stretch and provide some "give" when the end user suddenly contacts the extension strap 160.

As discussed earlier with respect to FIG. 6, it is to be understood that the seat pad assembly 500 may include an adjustable extension strap 160 that is connected to the existing seat belt assembly 200 of the motorized vehicle to securely retain the end user while the end user sits on the seat pad assembly 150 thereby possibly correcting the positioning of lap belt portion 204. For example, the seat pad assembly 500 can be utilized by a pregnant woman to keep the lap belt portion of the seat belt assembly away from and under her stomach in order to avoid any pressure in that area. Also, the adjustable extension strap 160 should not allow the end user to slouch and thereby change positioning of the seat belt assembly 200 to a less safe orientation.

A unique aspect of the present invention is the use of seat pad assembly 500. The construction of seat pad assembly 500 allows the seat pad assembly 500 to be easily rolled up or folded so that seat pad assembly 500 can be easily stored and transported in a backpack or other similar type of bag or container.

Another unique aspect of the present invention is the use of seat pad assembly restraining shoulder strap 502 and restraining shoulder strap/seat belt connector 504. Preferably, seat pad assembly restraining shoulder strap 502 and restraining strap/seat belt connector 504 are constructed of any suitable, durable, stain resistant, high strength, lightweight materials. Also, seat pad assembly restraining shoulder strap 502 is conventionally attached at one end to the seat pad 152 by conventional fastening techniques such as sewing, stitching, fasteners, adhesives or the like. It can be as well removably attached by other means. Further, restraining shoulder strap/seat belt connector 504 is connected to the other end of seat pad assembly restraining shoulder strap 502 in a manner that it allows for fixed repositioning it on shoulder strap 502 and adjusting shoulder strap 502 to a needed length that will allow existing car seat belt to be correctly positioned on end user's shoulder.

Finally, it is to be understood that restraining strap/seat belt connector 504 should be constructed to that it easily connects to the existing end of upper seat belt portion 202 and is able to slide along a length of upper seat belt portion 202. In this manner, seat pad assembly restraining shoulder strap 502 and restraining shoulder strap/seat belt connector 504 can be used to keep the existing car seat belts positioned correctly on a end user shoulder.

During the operation of seat pad assembly 500, as shown in FIGS. 2, 3, 6, 6A, 7, 8A, and 16, the seat pad 152 is located on seat 56. As best shown in FIGS. 2, 3, 6, 6A, 7, and 8A, the adjustable strap 158 is then conventionally attached to vehicle anchors 104. In particular, strap fasteners 154 are conventionally attached to vehicle strap anchors 104. It is to be understood that strap fasteners 154 can be, but are not limited to clamps, hooks or other similar fastening devices. After strap fasteners 154 are attached to vehicle anchors 104, the ends 158 of adjustable strap 158 are conventionally pulled through strap adjustment devices 156 in order to properly secure adjustable strap 158 to vehicle anchors 104.

Once the adjustable strap 158 has been secured to vehicle anchors 104, the end user 208 then locates himself/herself onto seat pad assembly 500, in a similar manner as discussed earlier with respect to FIGS. 7 and 8A. The end user 208 then pulls the conventional vehicle safety belt assembly 200 so that upper seat belt portion 202 of vehicle safety belt assembly 200 is located over the shoulder and torso of the end user 208. Also, the lap belt portion 204 of vehicle safety belt assembly 200 is located over the lap of the end user 208.

After the conventional vehicle safety belt assembly 200 has been located over the end user 208, the clamp end 166 of clamp 162 is conventionally slipped over the lap belt portion 204 of vehicle safety belt assembly 200 so that the extension strap 160 is now operatively connected to the lap belt portion 204 of the vehicle safety belt assembly 200, in a similar manner as better shown in FIGS. 7 and 8A. The end user 208 then conventionally attaches the vehicle safety belt assembly 200 to the conventional seat belt latch 206. Next, the end user 208 conventionally pulls on extension strap end 160a so that extension strap 160 is now securely retained on lap belt portion 204 through the use of extension strap adjustment device 164 and clamp 162. Finally, the end user attaches the seat pad assembly restraining shoulder strap 502 and restraining shoulder strap/seat belt connector 504 to the upper seat belt portion 202 so that the seat belt can be correctly positioned on end user shoulder.

A unique inventive aspect of the present invention is that seat pad assembly 500 may not have to be used in conjunction with adjustable strap 158, conventional vehicle anchors 104, conventional strap fasteners 154, and conventional strap adjustment devices 156. In particular, if for example, the end user is going for a ride in a taxi cab or other similar mass transit type of vehicle, it may not be convenient for the seat pad assembly 500 to be attached to the vehicle anchors 104. In this instance, the seat pad assembly 500 is located onto the seat 56 and the end user merely places himself/herself onto seat pad assembly 500. The end user then pulls the conventional vehicle safety belt assembly 200 so that upper seat belt portion 202 of vehicle safety belt assembly 200 is located over the shoulder and torso of the end user. Also, the lap belt portion of vehicle safety belt assembly 200 is then located over the lap of the end user.

In this instance, after the conventional vehicle safety belt assembly 200 has been located over the end user, the clamp end of clamp 162 is conventionally slipped over the lap belt portion so that the extension strap 160 is now operatively connected to the lap belt portion of the vehicle safety belt assembly 200, as discussed earlier. The end user then conventionally attaches the vehicle safety belt assembly 200 to the conventional seat belt latch. Finally, the end user conventionally pulls on extension strap end so that extension strap is now securely retained on lap belt portion through the use of extension strap adjustment device and clamp 162, as discussed earlier.

Another unique aspect of the present invention is that due to the fact that the extension strap 160 is now connected to the lap belt portion, the extension strap 160 should somewhat keep the end user from slouching forward on the vehicle car seat assembly 50, as discussed earlier.

A further unique aspect of the present invention is that since the extension strap 160 is adjustable, the seat pad assembly 150 can be used for end users of various ages and sizes.

A still another unique aspect of the present invention is that due to the fact that the seat pad assembly 500 is constructed of flexible, thin, lightweight, durable, stain resistant, non-slip materials, the seat pad assembly 500 can be easily rolled-up, folded-up or otherwise compacted so that the seat pad assembly 500 can be easily stored and transported.

Safety Vest Restraint Assembly

Figure 9:
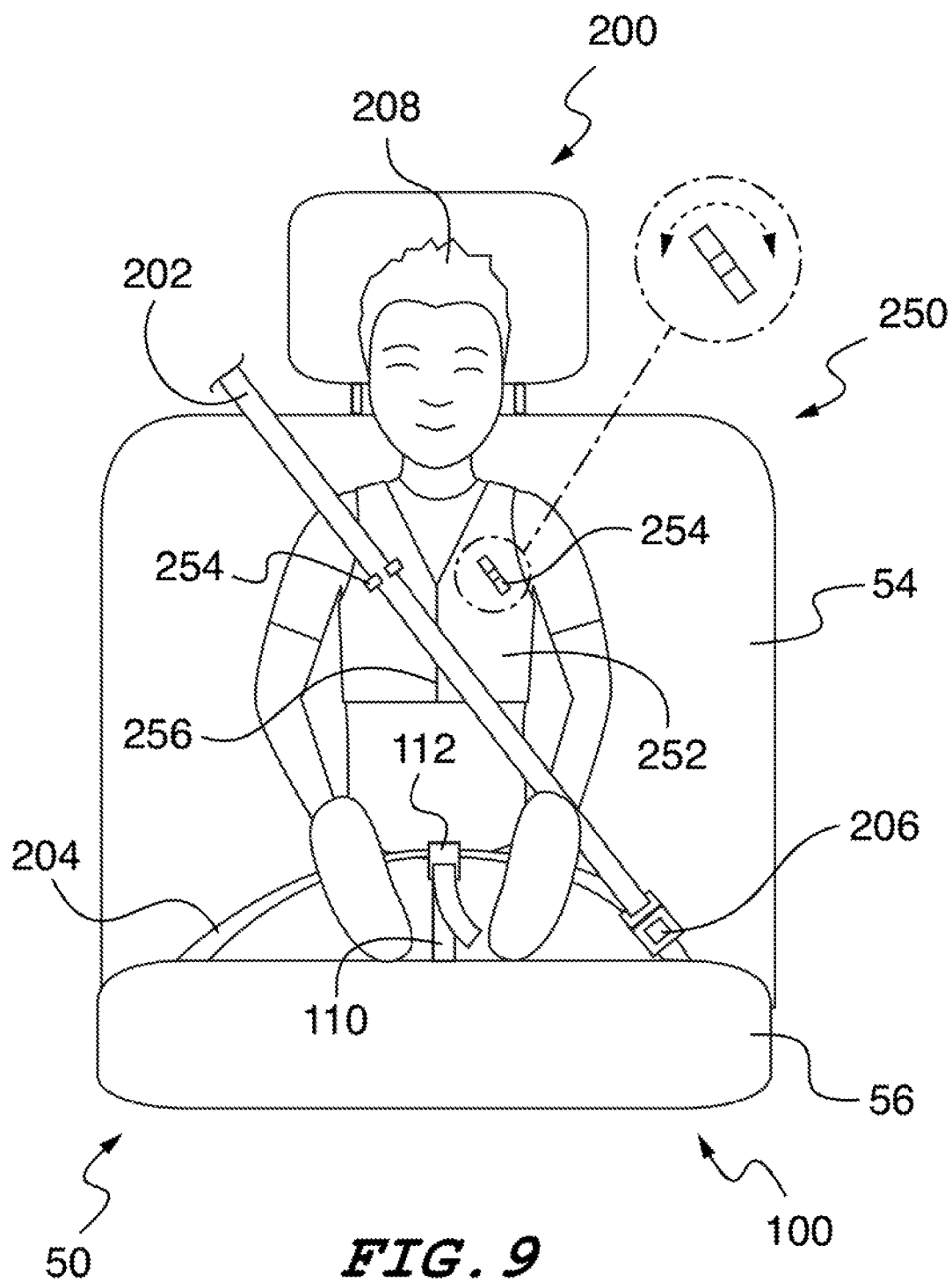
FIG. 9 is a schematic view of the safety vest restraint assembly being used in conjunction with the strap extension adjustment assembly, constructed according to the present invention.
Figure 10:
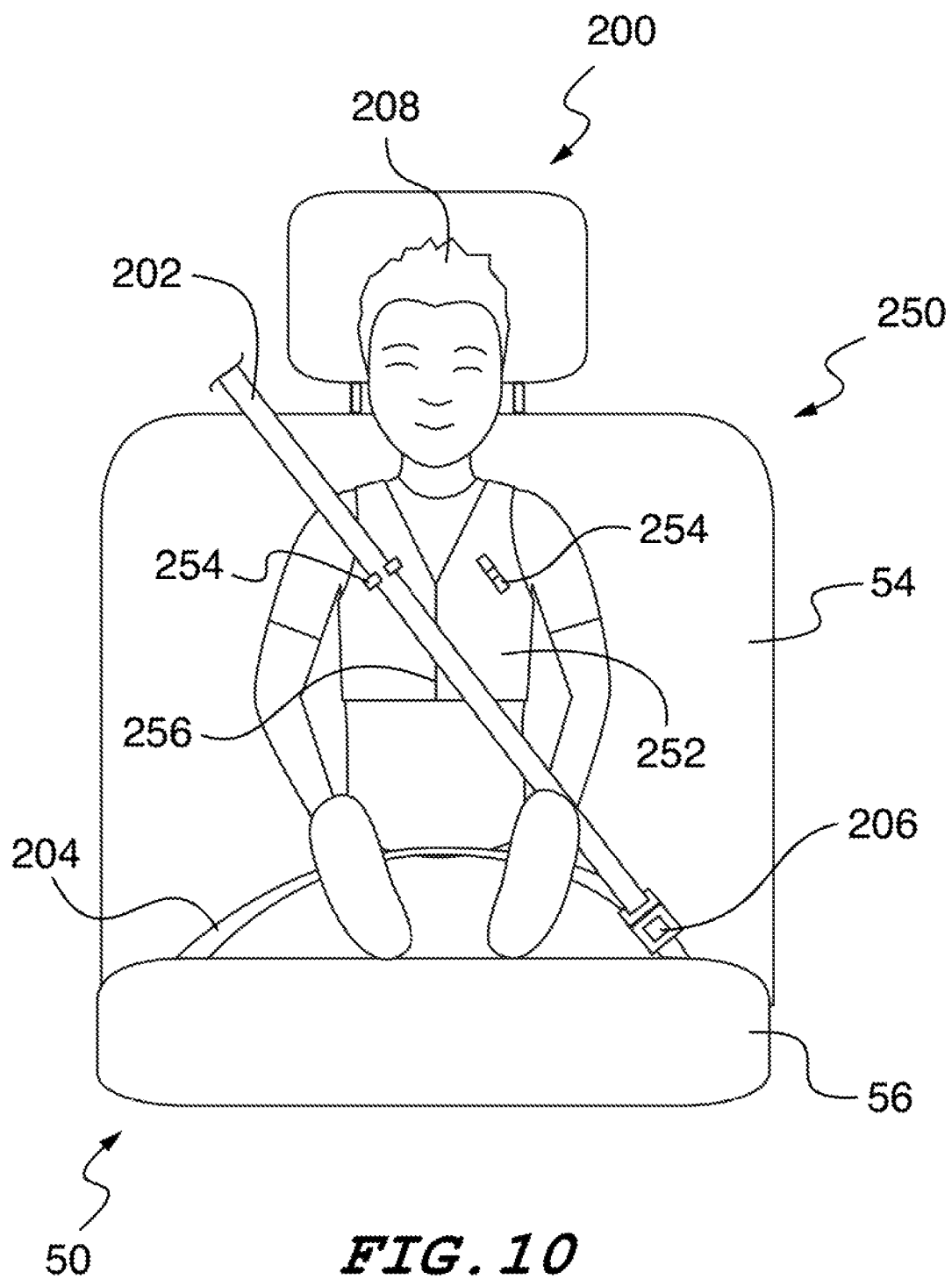
FIG. 10 is a schematic view of the safety vest restraint assembly being used in conjunction with the existing vehicle safety belt assembly, constructed according to present invention.

Referring now to FIGS. 9 and 10, there is illustrated a safety vest restraint assembly 250 for use with an existing vehicle seat assembly 50. As will be explained hereinafter in greater detail, the safety vest restraint assembly 250 can be used in conjunction with a conventional seat belt assembly 200 and, optionally, a strap extension adjustment assembly 100 to property retain the end user 208 onto the vehicle car seat assembly 50. The safety vest restraint assembly 250 uses a unique swiveling seat belt restraint retainer that allows the end user 208 to move while being restrained by the seat belt assembly 200 and an adjustable safety vest without the seat belt assembly 200 contacting the neck or head area of the end user but rather keeping it at the correct spot all the time.

As shown in FIGS. 9 and 10, safety vest restraint assembly 250 for use with an existing vehicle car seat assembly 50 includes, in part, adjustable safety vest 252, swiveling seat belt retainers 254, and vest fastener 256. Preferably, adjustable safety vest 252, swiveling seat belt retainers 254, and vest fastener 256 are constructed of any suitable durable, stain resistant, high strength, and lightweight material. It is to be further understood that safety vest 252 is adjustable in that different sizes of safety vest 252 can be supplied in order to fit an adult, a teenager or a child. It is to be further understood that vest fastener 256 is any suitable fastener that is capable of allowing adjustable vest 252 to be property retained on the end user 208 such as a zipper, buckles, buttons, hooks or the like.

It is to be even further understood that swiveling seat belt retainers 254 are conventionally attached onto around the shoulder areas of adjustable safety vest 252 by conventional fasteners (not shown) such as grommets, rivets, or the like. The key feature of fasteners on swiveling seat belt retainers 254 being that the fasteners must allow the swiveling seat belt retainers 254 to easily rotate around while being attached to safety vest 252 but still property retain the swiveling seat belt retainers 254 onto the adjustable safety vest 252.

A unique aspect of the present invention is the use of swiveling seat belt retainers 254. Preferably, swiveling seat belt retainers 254 are used to retain upper seat belt portion 202 of seat belt assembly 200 against the shoulder area of safety vest 252. Due to the fact that swiveling seat belt retainers 254 are able to rotate, swiveling seat belt retainers 254 allow the end user 208 to move around the seat assembly 50 while being restrained by the seat belt assembly 200 and the adjustable safety vest 252 without the seat belt assembly 200 (particularly upper seat belt portion 202) contacting the neck or head area of the end user 208 but rather keeping it at the correct spot all the time.

It is to be understood that the safety vest restraint assembly 250 uses the unique swiveling seat belt retainers 254 in order to allow the end user 208 to move and allow the upper seat belt portion 202 to follow the end user 208 without changing the proper position of the upper seat belt portion 202 on the shoulder of the end user 208 while being restrained by the seat belt assembly 200 and an adjustable safety vest assembly 250 without the seat belt assembly 200 contacting the neck or head area of the end user. This following of the upper seat belt portion 202 with the end user 208 is extremely important during an accident such as when the vehicle is braking and swiveling prior to the final crash and the end user's torso is changing its position.

Another unique aspect of the present invention is the construction of safety vest restraint assembly 250. The construction of safety vest restraint assembly 250 allows the safety vest restraint assembly 250 to be easily rolled up or folded so that safety vest restraint assembly 250 can be easily stored and transported in a backpack or other similar type of bag or container.

During the operation of safety vest restraint assembly 250, as shown in FIGS. 9 and 20, the adjustable safety vest 252 is placed on the end user 208 and the adjustable safety vest 252 is secured to the end user by activating vest fastener 256 such as using a zipper to zip together adjustable safety vest 252.

As shown in FIG. 9, safety vest restraint assembly 250 may optionally be equipped with strap extension adjustment assembly 100. It is to be understood that the strap extension adjustment assembly 100 used in conjunction with safety vest restraint assembly 250 is constructed in substantially the same manner as strap extension adjustment assembly 100, as previously discussed.

Once the adjustable lap belt assembly 100 has been secured, as discussed above, the end user 208 then locates himself/herself onto the vehicle seat assembly 50 at the location of seat belt assembly 200, as shown in FIG. 9. The end user 208 then pulls the conventional vehicle safety belt assembly 200 so that upper seat belt portion 202 of seat belt assembly 200 is located over the shoulder and torso of the end user 208. Also, the lap belt portion 204 of seat belt assembly 200 is located over the lap of the end user 208. The end user then secures a portion of the upper seat belt portion 202 into one of the swiveling seat belt retainers 254, preferably the swiveling seat belt retainer 254 that is now located adjacent to the upper seat belt portion 202.

After the conventional vehicle safety belt assembly 200 has been located over the end user 208, the clamp 112 is conventionally attached to lap belt portion 204 of seat belt assembly 200 so that the extension strap 110 is now operatively connected to the lap belt portion 204 of the vehicle safety belt assembly 200, as previously discussed and as now shown in FIG. 9. The end user 208 then conventionally attaches the vehicle safety belt assembly 200 to the conventional seat belt latch 206. Finally, the end user 208 conventionally pulls on extension strap end of the extension strap 110 so that extension strap 110 is now securely retained on lap belt portion 204 of seat belt assembly 200 through the use of extension strap adjustment device and clamp 112, as previously discussed.

With respect to FIG. 10, a unique inventive aspect of the present invention is that safety vest restraint assembly 250 may not have to be used in conjunction with adjustable lap belt assembly 100. In particular, if for example, the end user 208 is going for a ride in a taxi cab or other similar mass transit type of vehicle, it may not be convenient for the adjustable lap belt assembly 100 to be attached to the vehicle anchors. In this instance, the end user 208 merely locates himself/herself onto the vehicle seat assembly 50 at the location of seat belt assembly 200, as shown in FIG. 10. The end user 208 then pulls the conventional vehicle safety belt assembly 200 so that upper seat belt portion 202 of seat belt assembly 200 is located over the shoulder and torso of the end user 208. Also, the lap belt portion 204 of seat belt assembly 200 is located over the lap of the end user 208. The end user then secures the upper seat belt portion 202 of seat belt assembly 200 into one of the swiveling seat belt retainers 254, preferably the swiveling seat belt retainer 254 that is now located adjacent to the upper seat belt portion 202. The end user 208 then conventionally attaches the vehicle safety belt assembly 200 to the conventional seat belt latch 206, as discussed earlier.

Another unique aspect of the present invention is that safety vest restraint assembly 250 can be used in conjunction with seat belt assembly 200 and seat pad assembly 150 or 500 (not shown). In this manner, the seat pad assembly 150 or 500 is placed on the seat assembly 50, as discussed earlier. The end user 208 then dons safety vest restraint assembly 250, as discussed earlier. The seat belt assembly 200 is attached to the end user 208, as discussed earlier. The end user seat pad assembly 150 or 500 is then attached to the seat belt assembly 200, as discussed earlier.

Hi-Back Car Seat Restraint Assembly

Figure 11:
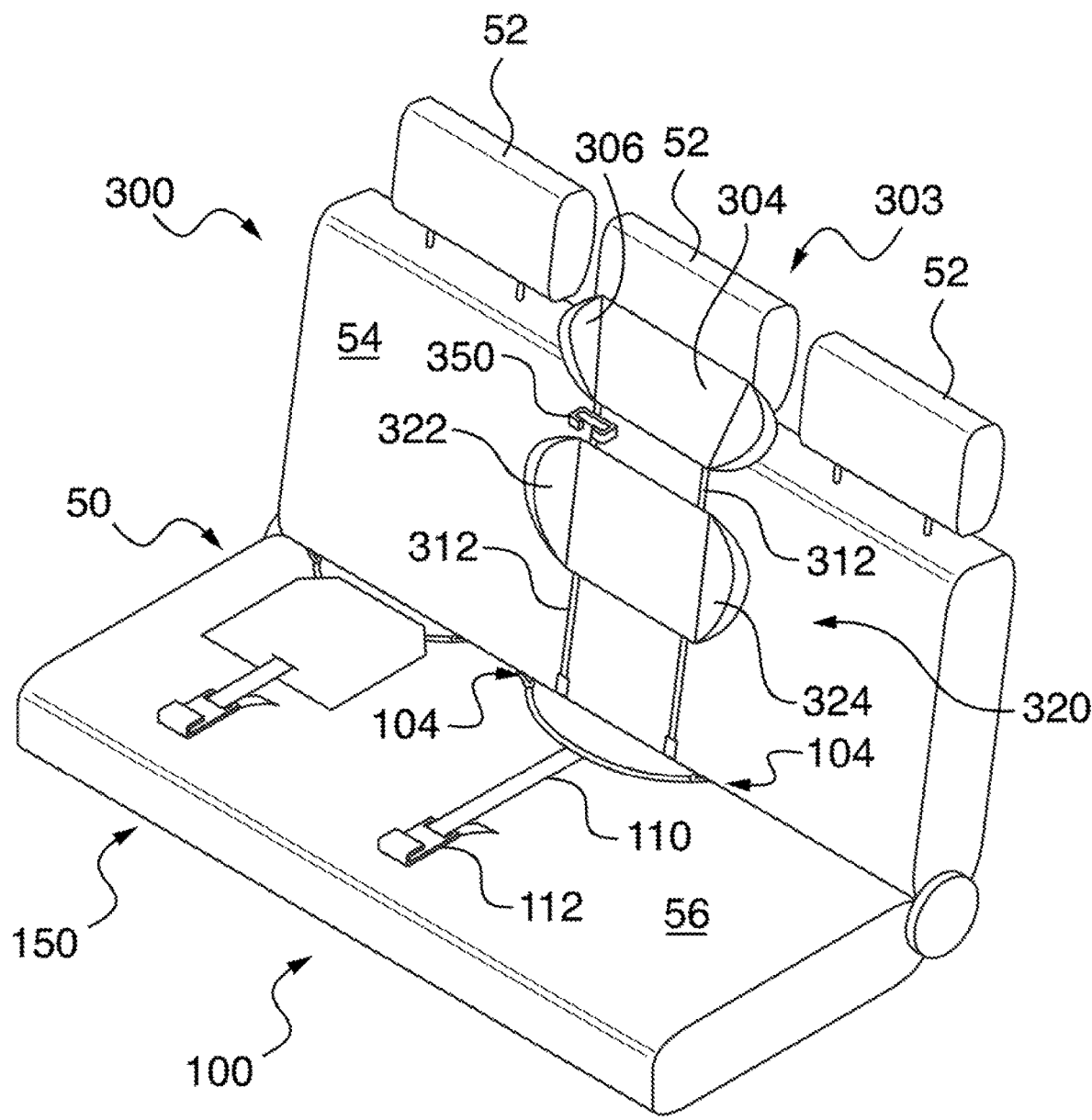
FIG. 11 is schematic illustration of another embodiment of a portable hi-back car seat restraint assembly for use with an adjustable strap assembly having a strap extension, constructed according to another embodiment of the present invention.
Figure 12:
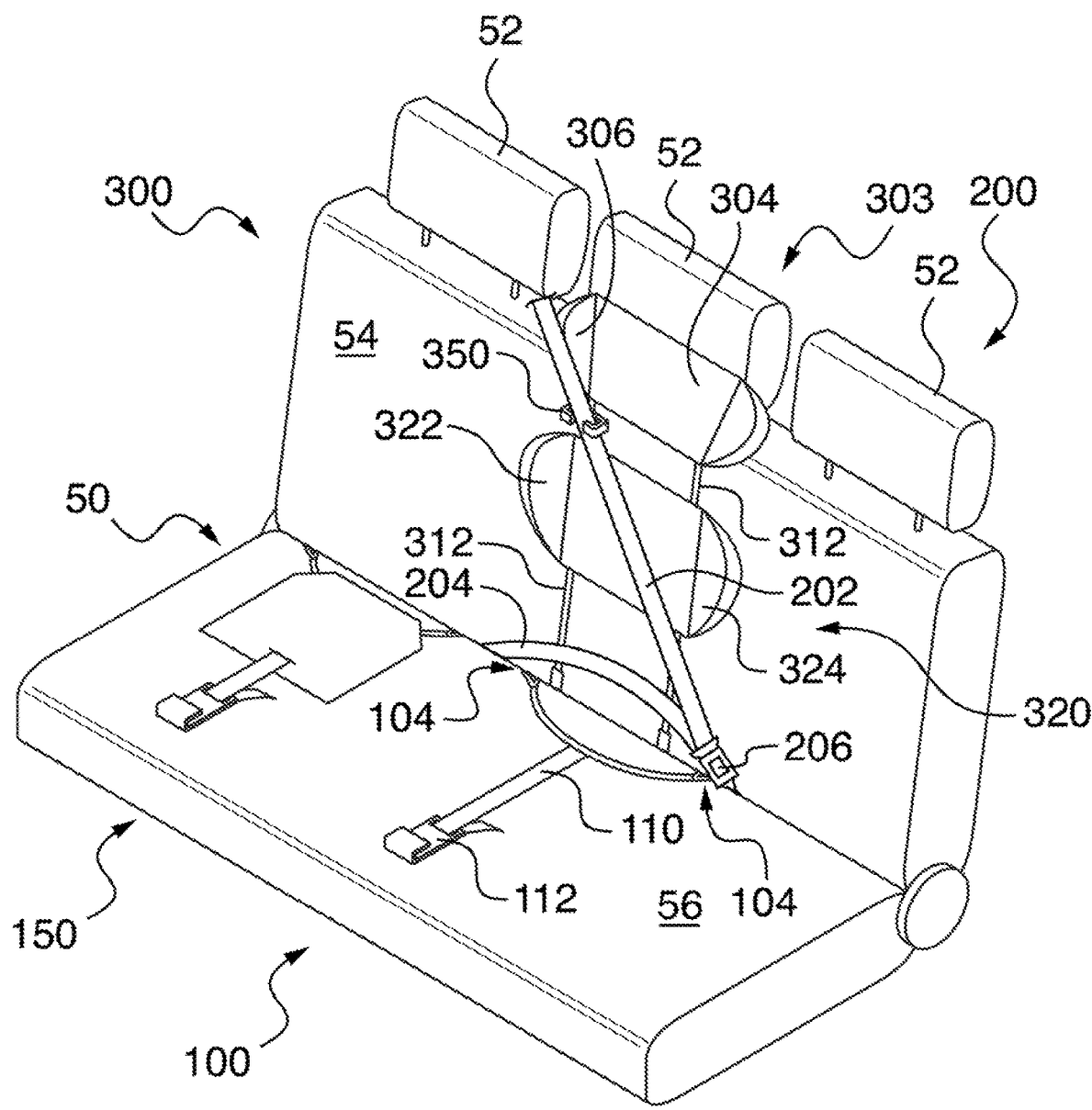
FIG. 12 is schematic illustration of the portable hi-back car seat restraint assembly for use with an adjustable strap assembly having a strap extension, as shown in FIG. 11, used in conjunction with an existing vehicle safety belt assembly, constructed according to another of the present invention.
Figure 13:
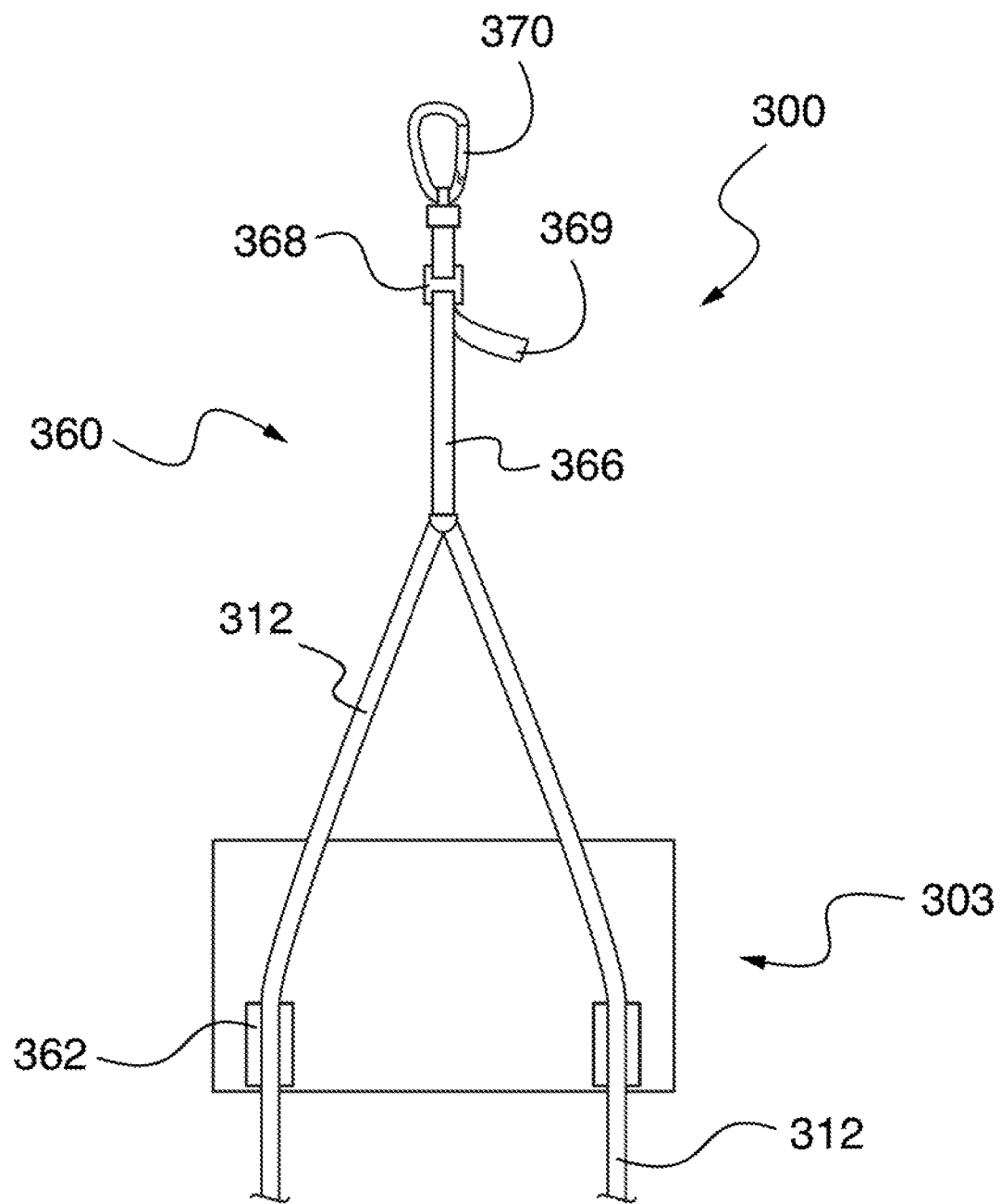
FIG. 13 is a schematic illustration of an optional embodiment for attaching the upper piece of the portable hi-back car seat restraint assembly to an existing vehicle headrest, constructed according to another of the present invention.

Referring now to FIGS. 11-13, there is illustrated a portable hi-back car seat assembly 300 for use with an existing vehicle seat assembly 50. As will be explained hereinafter in greater detail, the portable hi-back car seat assembly 300 is constructed of three pieces such that the upper piece 303 is located adjacent to a vehicle headrest 52 or vehicle upper anchor and the portable hi-back car seat assembly 300 is located over an existing car seat back 54. Also, the novel portable hi-back car seat assembly 300 includes an adjustable strap 312 that is connected to the existing vehicle anchors 104 and the headrest 52 or vehicle upper anchor. Finally, the upper piece 303, the lower piece 320 and swiveling seat belt retainer 350 of the portable hi-back car seat assembly 300 are removably retained on the straps 312 that are attached to the headrest 52 or vehicle upper anchor and the vehicle lower anchors 104. The portable hi-back car seat assembly 300 can also be used in conjunction with an adjustable extension strap assembly 100 that is operatively connected to an adjustable lap belt 110. The adjustable extension strap 110 then is connected to the existing seat belt assembly 200 of the motorized vehicle to securely retain the end user. Furthermore, it is to be understood that the portable hi-back car seat assembly 300 should be as "thin" as possible (not unnecessarily protruding forward from the back seat) so that the end user is further away from the back of the front seat or any other possible obstacle and provides protection against head injuries (the end user has to travel further in order to hit the back of the front seat). Also, the portable hi-back car seat assembly 300 should allow the end user to be seated low on the seat 50 which is further away from the back of the front seat. Finally, the portable hi-back car seat assembly 300 should keep the end user low on the car seat 50 which changes the end user's center of gravity center and therefore, reduces forward head movements by the end user.

As shown in FIGS. 11 and 12, portable hi-back car seat assembly 300 for use with an existing vehicle car seat assembly 50 includes, in part, upper panel assembly 303, upper panel 304, headrest 306, straps 312, lower panel assembly 320, lower panel 322, side rest 324, swiveling seat belt retainer 350, vehicle seat assembly 50, conventional vehicle seat headrests 52, conventional vehicle seat back 54, conventional vehicle seat 56, adjustable lap belt assembly 100 and seat pad assembly 150. Preferably, upper panel 304, headrest 306, straps 312, lower panel 322, side rest 324, and swiveling seat belt retainer 350 are constructed of any suitable, durable, stain resistant, flexible, lightweight material. It is to be further understood that headrest 306 and side rest 324 can be constructed of any suitable durable, inflatable material. It is to be even further understood that swiveling seat belt retainer 350 should be constructed such that swiveling seat belt retainer 350 is able to be removably secured to straps 312, retain the upper seat belt portion 202 of vehicle safety belt assembly 200 within the swiveling seat belt retainer 350.

A unique aspect of the present invention is the use of upper panel assembly 303 and lower panel assembly 320. The construction of upper panel assembly 303 and lower panel assembly 320 allows the portable hi-back car seat assembly 300 to be easily rolled up or folded so that portable hi-back car seat assembly 300 can be easily stored and transported in a backpack or other similar type of bag or container. Furthermore, once portable hi-back car seat assembly 300 has been installed onto vehicle seat assembly 50, headrest 306 and side rest 324 can be inflated.

Another unique aspect of the present invention is the use of straps 312, headrest 306, side rest 324, and swiveling seat belt retainer 350. It is to be understood that headrest 306 allows the end user to rest his/her head on the headrest 306 while the end user is traveling in the motorized vehicle. As discussed above, the use of the straps 312 allows the headrest 306 to be positioned up or down along the length of the straps 312 so that the headrest 306 is properly positioned with respect to the head of the end user. As discussed above, it is to be understood that the headrest 306 is equipped with an attachment device (not shown) that interacts with straps 312 in order to properly retain the headrest 306 on the straps 312.

Furthermore, it is to be understood that side rest 324 allows the end user to rest his/her torso on the side rest 324 while the end user is traveling in the motorized vehicle. As discussed above, the use of the strap 312 allows the side rest 324 to be positioned up or down along the length of the straps 312 so that the side rest 324 is properly positioned with respect to the torso of the end user. As discussed above, it is to be understood that the side rest 324 is equipped with an attachment device (not shown) that interacts with the strap 312 in order to properly retain the side rest 324 on the strap 312.

Finally, it is to be understood that swiveling seat belt retainer 350 allows the end user to retain the upper seat belt portion 202 of vehicle safety belt assembly 200 within the swiveling seat belt retainer 350. Furthermore, as discussed above, the use of the strap 312 allows the swiveling seat belt retainer 350 to be positioned up or down along the length of the straps 312 so that the swiveling seat belt retainer 350 is properly positioned with respect to the shoulder area of the end user. As discussed above, it is to be understood that the swiveling seat belt retainer 350 is equipped with an attachment device (not shown) that interacts with the strap 312 in order to property retain the swiveling seat belt retainer 350 on the strap 312.

As shown in FIGS. 11 and 12, portable hi-back car seat assembly 300 can be used in conjunction with strap extension adjustment assembly 100. It is to be understood that the strap extension adjustment assembly 100 used in conjunction with portable hi-back car seat assembly 300 is constructed in substantially the same manner as strap extension adjustment assembly 100, as previously discussed.

As shown in FIG. 13, upper piece 303 of portable hi-back car seat assembly 300 can be attached to an existing vehicle headrest (not shown) through the use of upper piece attachment assembly 360. Upper piece attachment assembly 360 provides an alternative method of attaching portable hi-back car seat assembly 300 to the existing vehicle headrest or to vehicle upper anchor so that portable hi-back car seat assembly 300 is able to hang over the existing seat back, as discussed earlier. As shown in FIG. 13, upper piece attachment assembly 360 includes, in part, upper piece attachments 362, straps 312, extension strap 366, conventional strap adjustment device 368, extension strap end 369, and conventional anchor strap fastener 370. Preferably, upper piece attachments 362, extension strap 366, conventional strap adjustment device 368, extension strap end 369, and conventional anchor strap fastener 370 are constructed of durable, stain resistant, high strength, lightweight materials. It is to be understood that extension strap 366 is conventionally attached to straps 312 by well-known fastening techniques such as sewing, adhesives, fasteners or the like. It is to be further understood that upper piece attachments 362 are constructed of Velcro® and straps 312 include conventional fastening devices such as Velcro® that are conventionally attached to straps 312 such that straps 312 will be able to be removably secured to upper piece attachments 362.

In order to connect upper piece attachment assembly 360 to the existing vehicle headrest or vehicle upper anchor, conventional strap fastener 370 is attached to vehicle upper anchor or located around the existing vehicle headrest. The extension strap end 369 is then adjusted in conjunction with the conventional strap adjustment device 368 so that the upper piece attachment assembly 360 is firmly secured to the vehicle upper anchor or headrest.

Once the piece attachment assembly 360 has been secured to the vehicle headrest, the upper piece 303 can then be located on straps 312 through the use of upper piece attachments 362, as discussed above. In this manner, portable hi-back car seat assembly 300 is able to hang over the existing seat back, as discussed earlier.

During the operation of portable hi-back car seat assembly 300, once the adjustable lap belt assembly 100 has been secured, as discussed above, the end user conventionally attaches one of the ends of a straps 312 to existing vehicle anchors 104 and the other of the ends of straps 312 to headrests 52 or vehicle upper anchor. It is to be understood that straps 312 can be equipped with conventional devices that allow the lengths of straps 312 to be adjusted so that straps 312 are firmly retained against seat back 54. The end user then determines the proper location of headrest 306, side rest 324 and swiveling seat belt retainer 350 along the length of straps 312. Finally, the end user can then inflate headrest 306 and side rest 324, if needed.

The end user then locates himself/herself onto the vehicle seat assembly 50 at the location of seat belt assembly 200 and portable hi-back car seat assembly 300. The end user then pulls the conventional vehicle safety belt assembly 200 so that upper seat belt portion 202 of seat belt assembly 200 is located over the shoulder and torso of the end user. Also, the lap belt portion 204 of seat belt assembly 200 is located over the lap of the end user. The end user then secures a portion of the upper seat belt portion 202 into the swiveling seat belt retainer 350, preferably the swiveling seat belt retainer 350 that is now located adjacent to the upper seat belt portion 202.

After the conventional vehicle safety belt assembly 200 has been located over the end user, the clamp 112 is conventionally attached to lap belt portion 204 of seat belt assembly 200 so that the extension strap 110 is now operatively connected to the lap belt portion 204 of the vehicle safety belt assembly 200, as previously discussed. The end user then conventionally attaches the vehicle safety belt assembly 200 to the conventional seat belt latch 206. Finally, the end user 208 conventionally pulls on extension strap end of the extension strap 110 so that extension strap 110 is now securely retained on lap belt portion 204 of seat belt assembly 200 through the use of extension strap adjustment device and clamp 112, as previously discussed.

A unique inventive aspect of the present invention is the use of portable hi-back car seat assembly 300 and adjustable lap belt assembly 100 in conjunction with vehicle safety belt assembly 200. In particular, once the end user has been properly restrained onto the vehicle car seat assembly 50 through the use of portable hi-back car seat assembly 300 and vehicle safety belt assembly 200, the headrest 306 will provide impact protection for the end user's head. Also, the side rest 324 will provide impact protection for the end user's torso. Furthermore, due to the fact that the extension strap 110 is now connected to the lap belt portion 204 of vehicle safety belt assembly 200, the extension strap 110 should somewhat keep the end user 208 from slouching forward on the vehicle car seat assembly 50.

Another unique aspect of the present invention is that the headrest 306 and the side rest 324 are adjustable, as discussed earlier. In this manner, the hi-back car seat assembly 300 can be used for end users of various ages and sizes.

A still another unique aspect of the present invention is related to the fact that the hi-back car seat assembly 300 is constructed of flexible materials. In this manner, the hi-back car seat assembly 300 can be easily rolled-up, folded-up or otherwise compacted so that the hi-back car seat assembly 300 can be easily stored and transported.

A further unique aspect of the present invention is the use of swiveling seat belt retainer 350. Preferably, swiveling seat belt retainer 350 is used to retain upper seat belt portion 202 of seat belt assembly 200 against the shoulder area of the end user.

Figure 14:
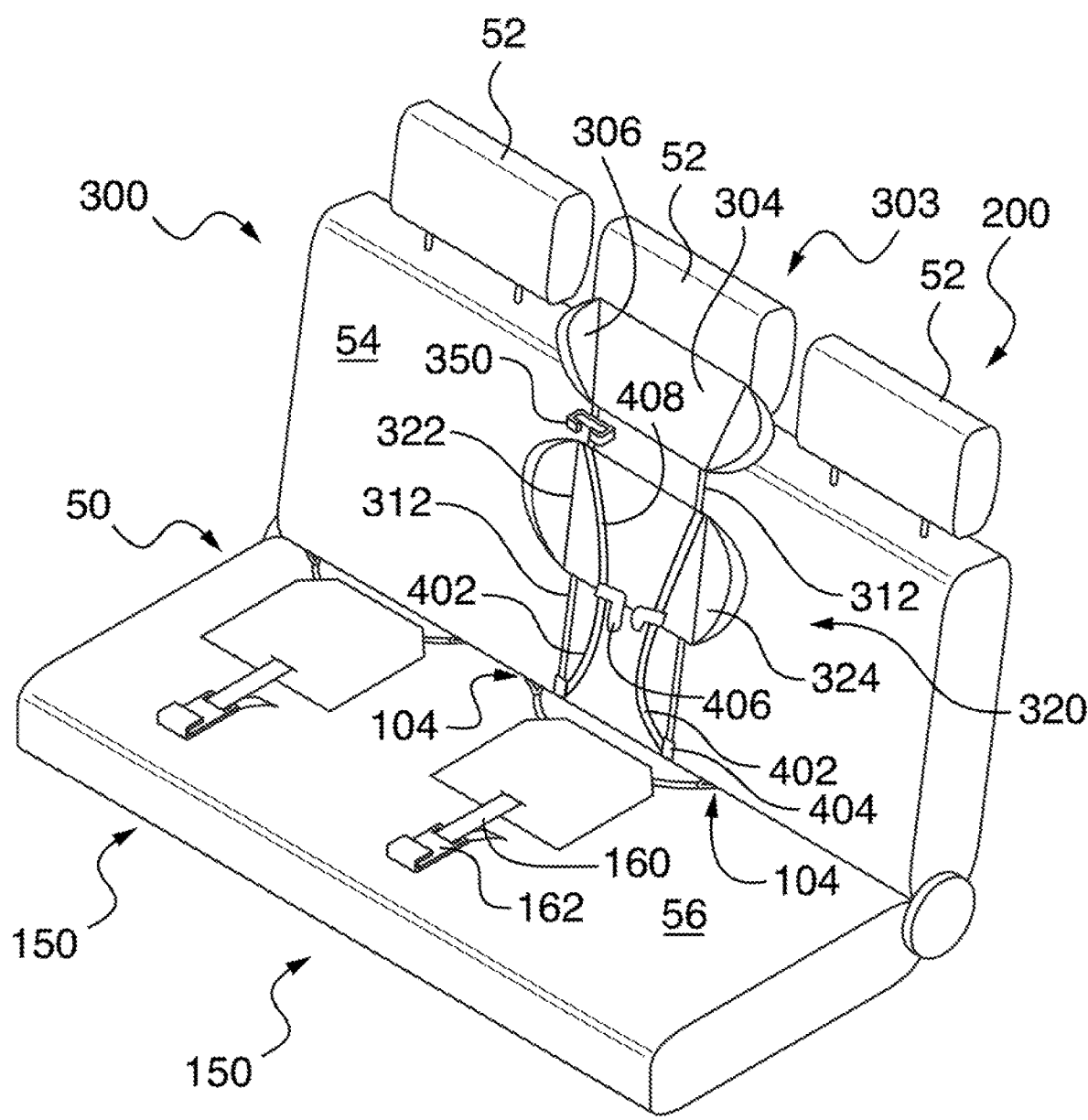
FIG. 14 is a schematic illustration of a second embodiment of the hi-back car seat restraint assembly and the car seat pad assembly being installed on a car seat using a five (5) point safety harness, constructed according to the present invention.
Figure 15:
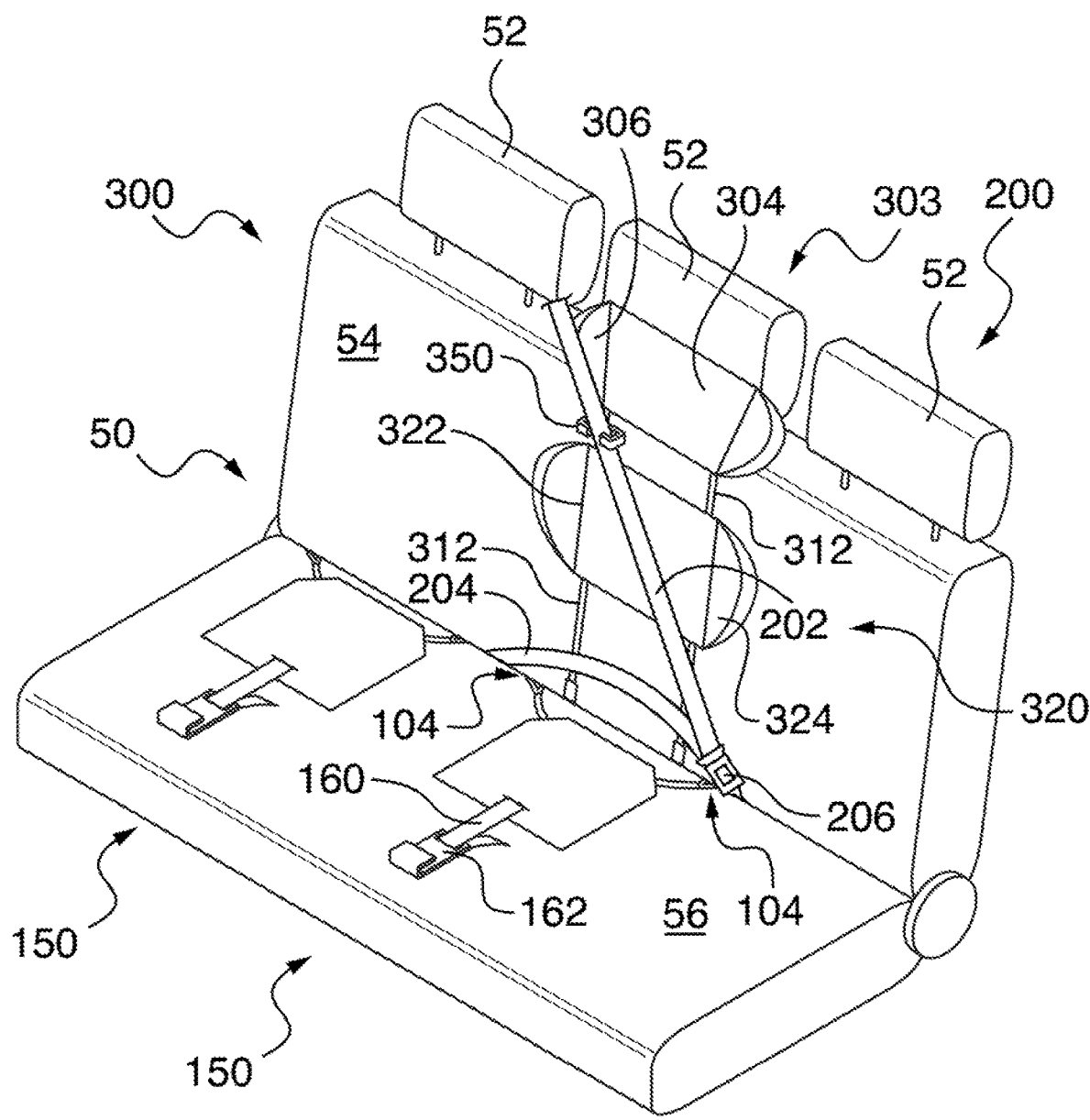
FIG. 15 is schematic illustration of a second embodiment of the portable hi-back car seat restraint assembly for use with a car seat pad assembly used in conjunction with an existing vehicle safety belt assembly, constructed according to another of the present invention.

Referring now to FIGS. 14 and 15, there is illustrated a portable hi-back car seat assembly 300 for use with an existing vehicle seat assembly 50 (FIG. 15) or for use with vehicle anchor system and utilizing 5-point restraint system (FIG. 15). As will be explained hereinafter in greater detail, the portable hi-back car seat assembly 300 is constructed of three pieces such that the upper piece 303 is located adjacent to a vehicle headrest 52 or vehicle anchor system and the portable hi-back car seat assembly 300 is located over an existing car seat back 54. Also, the novel portable hi-back car seat assembly 300 includes an adjustable strap 312 that is connected to the existing vehicle anchors 104 and the back of car seat 54 or vehicle upper anchor. Finally, the upper piece 303, the lower piece 320 and swiveling seat belt retainer 350 of the portable hi-back car seat assembly 300 are removably retained on the straps 312 that are attached to the back of car seat 54 or vehicle upper anchor and the vehicle anchors 104. The portable hi-back car seat assembly 300 can also be used in conjunction with seat pad assembly 150 or 500. As discussed earlier, seat pad assembly 150 or 500 is connected to the existing vehicle anchors 104. Furthermore, seat pad assembly 150 or 500 can be connected to the upper seat belt portion 202, as discussed earlier. Furthermore, it is to be understood that the portable hi-back car seat assembly 300 should be as "thin" as possible (not unnecessarily protruding forward from the back seat) so that the end user is further away from the back of the front seat or any other possible obstacle and provides protection against head injuries (the end user has to travel further in order to hit the back of the front seat). Also, the portable hi-back car seat assembly 300 should allow the end user to be seated low on the seat 50 which is further away from the back of the front seat. Finally, the portable hi-back car seat assembly 300 should keep the end user low on the car seat 50 which changes the end user's center of gravity center and therefore, reduces forward head movements by the end user.

As shown in FIGS. 14 and 15, portable hi-back car seat assembly 300 for use with an existing vehicle car seat assembly 50 includes, in part, upper panel assembly 303, upper panel 304, headrest 306, straps 312, lower panel assembly 320, lower panel 322, side rest 324, swiveling seat belt retainer 350, vehicle seat assembly 50, conventional vehicle seat headrests 52, conventional vehicle seat back 54, conventional vehicle seat 56, and seat pad assembly 150. Preferably, upper panel 304, headrest 306, straps 312, lower panel 322, side rest 324, and swiveling seat belt retainer 350 are constructed of any suitable, durable, stain resistant, flexible, lightweight material. It is to be further understood that headrest 306 and side rest 324 can be constructed of any suitable durable, inflatable material. It is to be even further understood that swiveling seat belt retainer 350 should be constructed such that swiveling seat belt retainer 350 is able to be removably secured to straps 312, retain the upper seat belt portion 202 of vehicle safety belt assembly 200 within the swiveling seat belt retainer 350 and also rotate so that upper seat belt portion 202 can be correctly adjusted to height of end user. Also, headrest 306, side rest 324 and swiveling seat belt retainer 350 may be equipped with a locking system that allows them to be securely repositioned on straps 312.

A unique aspect of the present invention is the use of upper panel assembly 303 and lower panel assembly 320. The construction of upper panel assembly 303 and lower panel assembly 320 allows the portable hi-back car seat assembly 300 to be easily rolled up or folded so that portable hi-back car seat assembly 300 can be easily stored and transported in a backpack or other similar type of bag or container. Furthermore, once portable hi-back car seat assembly 300 has been installed onto vehicle seat assembly 50, headrest 306 and side rest 324 can be inflated.

Another unique aspect of the present invention is the use of straps 312, headrest 306, side rest 324, and swiveling seat belt retainer 350. It is to be understood that headrest 306 allows the end user to rest his/her head on the headrest 306 while the end user is traveling in the motorized vehicle. As discussed above, the use of the straps 312 allows the headrest 306 to be positioned up or down along the length of the straps 312 so that the headrest 306 is properly positioned with respect to the head of the end user. As discussed above, it is to be understood that the headrest 306 is equipped with an attachment device (not shown) that interacts with straps 312 in order to properly retain the headrest 306 on the straps 312. For example, the backside of headrest 306 may be equipped with any locking system that allows it to move it on strap 312 and lock in place.

Furthermore, it is to be understood that side rest 324 allows the end user to rest his/her torso on the side rest 324 while the end user is traveling in the motorized vehicle. As discussed above, the use of the strap 312 allows the side rest 324 to be positioned up or down along the length of the straps 312 so that the side rest 324 is properly positioned with respect to the torso of the end user. As discussed above, it is to be understood that the side rest 324 is equipped with an attachment device (not shown) that interacts with the strap 312 in order to properly retain the side rest 324 on the strap 312. For example, the backside of side rest 324 may be equipped with any locking system that allows it to move it on strap 312 and lock in place.

Finally, it is to be understood that swiveling seat belt retainer 350 allows the end user to retain the upper seat belt portion 202 of vehicle safety belt assembly 200 within the swiveling seat belt retainer 350. Furthermore, as discussed above, the use of the strap 312 allows the swiveling seat belt retainer 350 to be positioned up or down along the length of the straps 312 so that the swiveling seat belt retainer 350 is property positioned with respect to the shoulder area of the end user. As discussed above, it is to be understood that the swiveling seat belt retainer 350 is equipped with an attachment device (not shown) that interacts with the strap 312 in order to properly retain the swiveling seat belt retainer 350 on the strap 312. For example, the backside of swiveling seat belt retainer 350 may be equipped with any locking system that allows it to move it on strap 312 and lock in place.

As shown in FIG. 14, portable hi-back car seat assembly 300 can also be equipped with a five (5) point harness assembly 400. In this embodiment, five (5) point harness assembly 400 includes, in part, lower harness straps 402, harness strap anchors 404, harness straps fasteners 406 and upper harness straps 408. Preferably, lower harness straps 402, harness strap anchors 404, harness straps fasteners 406 and upper harness straps 408 are constructed of any suitable, durable, high strength, lightweight materials. It is to be understood that that lower harness straps 402 are conventionally connected to the existing vehicle anchors 104. Also, the ends of upper harness straps 408 are conventionally attached to the back of lower panel 322 by conventional fasteners (not shown) that allow for length adjusting of harness strap 408.

During the operation of portable hi-back car seat assembly 300, as shown in FIGS. 14 and 15, once the seat pad assembly 150 (or 500) has been secured, as discussed above, the end user conventionally attaches one of the ends of a straps 312 to existing vehicle anchors 104 and the other of the ends of straps 312 to vehicle upper anchor (not shown here). It is to be understood that straps 312 can be equipped with conventional devices that allow the lengths of straps 312 to be adjusted so that straps 312 are firmly retained against seat back 54. The end user then determines the proper location of headrest 306, side rest 324 and swiveling seat belt retainer 350 along the length of straps 312. Finally, the end user can then inflate headrest 306 and side rest 324, if needed.

The end user then locates himself/herself onto the vehicle seat assembly 50 at the location of seat belt assembly 200 and portable hi-back car seat assembly 300. The end user then pulls the conventional vehicle safety belt assembly 200 so that upper seat belt portion 202 of seat belt assembly 200 is located over the shoulder and torso of the end user. Also, the lap belt portion 204 of seat belt assembly 200 is located over the lap of the end user. The end user then secures a portion of the upper seat belt portion 202 into the swiveling seat belt retainer 350, preferably the swiveling seat belt retainer 350 that is now located adjacent to the upper seat belt portion 202.

After the conventional vehicle safety belt assembly 200 has been located over the end user, the clamp 162 is conventionally attached to lap belt portion 204 of seat belt assembly 200 so that the extension strap 160 of seat pad assembly 150 (or 500) is now operatively connected to the lap belt portion 204 of the vehicle safety belt assembly 200, as previously discussed. The end user then conventionally attaches the vehicle safety belt assembly 200 to the conventional seat belt latch 206. Finally, the end user 208 conventionally pulls extension strap end 160*a* so that extension strap 160 is now securely retained on lap belt portion 204 of seat belt assembly 200, as previously discussed.

A unique inventive aspect of the present invention is the use of portable hi-back car seat assembly 300 and seat pad assembly 150 (or 500) in conjunction with vehicle safety belt assembly 200. In particular, once the end user has been properly restrained onto the vehicle car seat assembly 50 through the use of portable hi-back car seat assembly 300 and vehicle safety belt assembly 200, the headrest 306 will provide impact protection for the end user's head. Also, the side rest 324 will provide impact protection for the end user's torso. Furthermore, due to the fact that the extension strap 160 is now connected to the lap belt portion 204 of vehicle safety belt assembly 200, the extension strap 160 should somewhat keep the end user 208 from slouching forward on the vehicle car seat assembly 50.

Another unique aspect of the present invention is that the headrest 306 and the side rest 324 are adjustable, as discussed earlier. In this manner, the hi-back car seat assembly 300 can be used for end users of various ages and sizes.

A still another unique aspect of the present invention is related to the fact that the hi-back car seat assembly 300 is constructed of flexible materials. In this manner, the hi-back car seat assembly 300 can be easily rolled-up, folded-up or otherwise compacted so that the hi-back car seat assembly 300 can be easily stored and transported.

It is to be understood that end user, instead of securing upper seat belt portion 202 in swiveling seat belt retainer 350, he or she can use a safety vest 250 instead (FIG. 10) and secure upper seat belt portion 202 in a swiveling seat belt retainer 254. It can be done in order to allow the end user to move and allow the upper seat belt portion 202 to follow the end user without changing the proper position of the upper seat belt portion 202 on the shoulder of the end user while being restrained by the seat belt assembly 200 and hi-back car seat assembly 300 without the seat belt assembly 200 contacting the neck or head area of the end user. This following of the upper seat belt portion 202 with the end user is extremely important during an accident such as when the vehicle is braking and swiveling prior to the final crash and the end user's torso is changing its position.

With respect to FIG. 14, during the operation of portable hi-back car seat assembly 300, once the end user has located himself/herself onto the vehicle seat assembly 50 at the location of seat belt assembly 200 and portable hi-back car seat assembly 300, the end user can then extend his/her arms through upper harness straps 408. The end user then pulls on harness straps fasteners 406 inwardly so that harness straps fasteners 406 can be conventionally attached together to form a five (5) point harness. In this manner, the five (5) point harness assembly 500 provides yet another degree of restraint to keep the end user securely retained within the portable hi-back car seat assembly 300 in case the end user experiences a sudden stop.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the present invention and the present invention is not so limited.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other modifications and implementations will occur to those skilled in the art without departing from the spirit and scope of the invention. Accordingly, the description hereinabove is not intended to limit the invention.

Therefore, provided herein are new and improved portable hi-back car seat/restraint system/seat pad assemblies for use with existing vehicle seats and safety belts. The preferred portable hi-back car seat/restraint system/seat pad assemblies for use with existing vehicle seats and safety belts, according to various embodiments of the present invention, offers the following advantages: ease of use; lightness in weight; durability; thinness; the ability of the high back seat portable hi-back car seat assembly to allow an end user to be seated low on the seat; the ability of the safety vest to follow the end user without changing the proper position of the shoulder seat portion on the shoulder; compactness; the ability to be rolled up; improved safety belt characteristics; portability; ease of attachment to existing vehicle anchors; the ability to attach a variety of seat belts; increased safety; and the use of a unique strap extension retainer that securely retains the strap extension to the existing seat belt. In fact, in many of the preferred embodiments, these advantages of ease of use, lightness in weight, durability, thinness, the ability of the high back seat portable hi-back car seat assembly to allow an end user to be seated low on the seat, the ability of the safety vest to follow the end user without changing the proper position of the shoulder seat portion on the shoulder, compactness, the ability to be rolled up, improved safety belt characteristics, portability, ease of attachment to existing vehicle anchors, the ability to attach a variety of seat belts, increase safety, and the use of a unique strap extension retainer that securely retains the strap extension to the existing seat belt are optimized to an extent that is considerably higher than heretofore achieved in prior, known supplemental devices for use with existing vehicle safety belts.

What I claim is:

1. A hi-back vehicle seat and seat pad restraint system, comprising:
   a vehicle seat assembly having a vehicle seat back and a vehicle seat operatively connected to the vehicle seat back and a plurality of vehicle anchors located adjacent to the vehicle seat back and the vehicle seat;
   a hi-back vehicle seat assembly, wherein the hi-back vehicle seat assembly comprises:
      a vertically adjustable upper piece,
      a vertically adjustable lower piece, and
      a plurality of straps that operatively connect the adjustable upper piece to the car seat back, operatively connect the adjustable upper piece to the adjustable lower piece, and operatively connect the adjustable lower piece to the vehicle seat assembly, wherein the adjustable upper piece and the adjustable lower piece can be adjustably located along a length of the plurality of straps;
   a vehicle safety belt assembly, wherein the vehicle safety belt assembly comprises:
      an upper seat belt portion operatively connected at one end to the vehicle seat back,
      a lap belt portion operatively connected at one end to the other end of upper seat belt portion and operatively connected at the other end of the lap belt portion to the vehicle seat assembly, and
      a vehicle seat belt latch located between the upper seat belt portion and the lap belt portion such that the vehicle seat belt latch is used to attach the vehicle safety belt assembly to the vehicle seat assembly; and
   a seat pad assembly, wherein the seat pad assembly comprises:
      a flexible seat pad having a first end and a second end,
      a plurality of stretchable seat pad straps, wherein each seat pad strap includes a first end and a second end such that the first end of each of the plurality of seat pad straps is operatively connected to the first end of the seat pad and the second end of each of the plurality of seat pad straps is operatively connected to one of the plurality of vehicle anchors,
      a stretchable extension strap having a first end and a second end such that the first end of the extension strap is attached to the second end of the seat pad and wherein a length of the extension strap is adjustable, and
      a clamp assembly operatively connected to the second end of the extension strap, wherein the clamp assembly can be attached to the lap belt portion of vehicle safety belt assembly and wherein the clamp assembly interacts with the second end of the extension strap to allow the length of the extension strap to be adjustable.

2. The hi-back vehicle seat and seat pad restraint system, according to claim 1, wherein the upper piece is further comprised of:
   an upper panel operatively connected to the plurality of straps; and
   a first headrest such that the first headrest is operatively connected to the upper panel.

3. The hi-back vehicle seat and seat pad restraint system, according to claim 1, wherein the lower piece is further comprised of:
   a lower panel operatively connected to the plurality of straps; and
   a first side rest such that the first side rest is operatively connected to the lower panel.

4. The hi-back vehicle seat and seat pad restraint system, according to claim 1, wherein the seat pad is constructed of:
   a durable, flexible, stain resistant, high strength, non-slip material.

5. The hi-back vehicle seat and seat pad restraint system, according to claim 1, wherein each of the plurality of seat pad straps is constructed of:
   an elastic material.

6. The hi-back vehicle seat and seat pad restraint system, according to claim 1, wherein the clamp assembly is further comprised of:
   a clamp having a first end and a second end;
   a clamp end operatively connected to the first end of the clamp; and
   an extension strap adjuster operatively connected to the second end of the clamp such that the extension strap adjuster interacts with the extension strap to adjust a length of the extension strap.

7. The hi-back vehicle seat and seat pad restraint system, according to claim 1, wherein the seat pad assembly is further comprised of:
   a strap fastener located on the second end of each of the plurality of seat pad straps, wherein the strap fastener is used to operatively connect each of the plurality of seat pad straps to the one of the plurality of vehicle anchors.

8. A vehicle restraint system, comprising:
   a vehicle seat assembly having a vehicle seat back and a vehicle seat operatively connected to the vehicle seat back and a plurality of vehicle anchors located adjacent to the vehicle seat back and the vehicle seat;
      a vehicle safety belt assembly, wherein the vehicle safety belt assembly comprises:
      an upper seat belt portion operatively connected at one end to the vehicle seat back,
      a lap belt portion operatively connected at one end to the other end of upper seat belt portion and operatively connected at the other end of the lap belt portion to the vehicle seat assembly, and
      a vehicle seat belt latch located between the upper seat belt portion and the lap belt portion such that the vehicle seat belt latch is used to attach the vehicle safety belt assembly to the vehicle seat assembly; and
   a seat pad assembly, wherein the seat pad assembly comprises;

a flexible, non-slip seat pad having a first end and a second end, a stretchable extension strap having a first end and a second end such that the first end of the extension strap is attached to the second end of the seat pad and wherein a length of the extension strap is adjustable, and a clamp assembly operatively connected to the second end of the extension strap, wherein the clamp assembly can be attached to the lap belt portion of vehicle safety belt assembly and wherein the clamp assembly interacts with the second end of the extension strap to allow the length of the extension strap to be adjustable.

9. The vehicle restraint system, according to claim 8, wherein each of the plurality of seat pad straps is constructed of:

an elastic material.

10. The vehicle restraint system, according to claim 8, wherein the clamp assembly is further comprised of:

a clamp having a first end and a second end;

a clamp end operatively connected to the first end of the clamp; and an extension strap adjuster operatively connected to the second end of the clamp such that the extension strap adjuster interacts with the extension strap to adjust a length of the extension strap.

11. The vehicle restraint system, according to claim 8, wherein the seat pad assembly is further comprised of:

a seat pad assembly restraining shoulder strap having a first end and a second end such that the first end of the seat pad assembly restraining shoulder strap is operatively connected to the first end of the seat pad; and a restraining shoulder strap connector operatively connected to the second of the seat pad assembly restraining shoulder strap, wherein the restraining shoulder strap can be operatively connected to the upper seat belt portion.

* * * * *